(12) United States Patent
Sekiguchi et al.

(10) Patent No.: US 7,747,094 B2
(45) Date of Patent: Jun. 29, 2010

(54) IMAGE ENCODER, IMAGE DECODER, IMAGE ENCODING METHOD, AND IMAGE DECODING METHOD

(75) Inventors: Shunichi Sekiguchi, Kanagawa (JP); Sadaatsu Kato, Kanagawa (JP); Mitsuru Kobayashi, Kanagawa (JP); Minoru Etoh, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1302 days.

(21) Appl. No.: 10/480,642

(22) PCT Filed: Jun. 28, 2002

(86) PCT No.: PCT/JP02/06614

§ 371 (c)(1),
(2), (4) Date: Dec. 24, 2003

(87) PCT Pub. No.: WO03/003749

PCT Pub. Date: Jan. 9, 2003

(65) Prior Publication Data

US 2004/0184666 A1      Sep. 23, 2004

(30) Foreign Application Priority Data

Jun. 29, 2001  (JP) .......................... P2001-199685

(51) Int. Cl.
*G06K 9/36* (2006.01)
*G06K 9/46* (2006.01)
*G06K 9/40* (2006.01)

(52) U.S. Cl. .............. 382/239; 362/236; 362/261; 362/262

(58) Field of Classification Search ............. 382/236, 382/239, 261, 268
See application file for complete search history.

(56) References Cited

U.S. PATENT DOCUMENTS 5,101,208 A * 3/1992 Parker et al. ............ 342/45

(Continued)

FOREIGN PATENT DOCUMENTS

EP        0 714 209 A2     5/1996

(Continued)

OTHER PUBLICATIONS

Telecommunication Standardization Sector of ITU, "Recommendation H.263—Video coding for low bit rate communication."Series H: Audiovisial and Multimedia Systems: Infrastructure of audiovisial services—Coding of moving video. 1998. pp. 80-84.*

(Continued)

*Primary Examiner*—Matthew C Bella
*Assistant Examiner*—Michael A Newman
(74) *Attorney, Agent, or Firm*—Oblon, Spivak, McClelland, Maier & Neustadt, L.L.P.

(57) ABSTRACT

An input image signal 101 is divided into MC block units and, when coding processing is performed in these divided units, a motion compensation section 107 generates a motion-compensated prediction image 106a by detecting movement amounts in predetermined MC block units, a smoothing filter section 124 performs, with respect to the prediction image 106a, smoothing of pixels located at the boundaries of adjoining MC blocks on the basis of predetermined evaluation criteria, and a prediction residual signal 108, which is obtained from the difference between the prediction image 106b obtained by the smoothing, and the input image (input image signal 101), is encoded. Accordingly, it is possible to use relatively straightforward computation to perform processing, with respect to a prediction frame image generated by block-unit motion-compensated interframe prediction (MC), to adaptively smooth a discontinuous waveform generated between MC blocks of the prediction frame image, whereby the efficiency of low bit rate coding that employs interframe MC is improved.

56 Claims, 25 Drawing Sheets

U.S. PATENT DOCUMENTS

| | | | | |
|---|---|---|---|---|
| 5,101,280 A | * | 3/1992 | Moronaga et al. | 382/239 |
| 5,543,848 A | * | 8/1996 | Murakami et al. | 348/416.1 |
| 5,646,867 A | * | 7/1997 | Ozcelik et al. | 375/240.14 |
| 5,742,344 A | | 4/1998 | Odaka et al. | |
| 5,751,861 A | * | 5/1998 | Astle | 382/250 |
| 5,850,294 A | * | 12/1998 | Apostolopoulos et al. | 358/426.14 |
| 6,104,434 A | * | 8/2000 | Nakagawa et al. | 375/240.16 |
| 6,240,135 B1 | * | 5/2001 | Kim | 375/240.01 |
| 6,307,887 B1 | * | 10/2001 | Gabriel | 375/240.16 |
| 6,317,522 B1 | * | 11/2001 | Rackett | 382/268 |
| 6,496,605 B1 | * | 12/2002 | Osa | 382/268 |
| 6,504,873 B1 | * | 1/2003 | Vehvilainen | 375/240.29 |
| 6,724,944 B1 | * | 4/2004 | Kalevo et al. | 382/268 |
| 6,904,175 B2 | * | 6/2005 | Chao et al. | 382/240 |

FOREIGN PATENT DOCUMENTS

| | | |
|---|---|---|
| JP | 63-208382 | 8/1988 |
| JP | 63-219270 | 9/1988 |
| JP | 3-127580 | 5/1991 |
| JP | 4-336787 | 11/1992 |
| JP | 6-311506 | 11/1994 |
| JP | 8-149470 | 6/1996 |

OTHER PUBLICATIONS

Jae Jeong Hwang, et al., "ITU-T Recommendation H.261 Video Coder-Decoder", Digital Consumer Electronics Handbook, I/I, XP001059410, Jan. 1997, pp. 10.01-10.26.

Ralph Neff, et al., IEEE Transactions on Circuits and Systems for Video Technology, vol. 7, No. 1, pp. 158-171 1997.

Le Gall. "MPEG: a video compression standard for multimedia applications", Communications of the ACM, vol. 34, No. 4, pp. 47-58 1991.

Y. L. Lee, et al., "Loop-filtering and Post-filtering for Low Bit-rates Moving Picture Coding", Image Processing, 1999, ICIP 99, Proceedings, International Conference on Kobe, Japan Oct. 24-28, 1999, IEEE, US, vol. 1, XP010369215, Oct. 24, 1999, pp. 94-98.

* cited by examiner

Fig.3A MC MODE 1

Fig.3B MC MODE 2

Fig.3C MC MODE 3

Fig.3D MC MODE 4

Fig.3E MC MODE 5

Fig.3F MC MODE 6

Fig.3G MC MODE 7

IMAGE ENCODER, IMAGE DECODER, IMAGE ENCODING METHOD, AND IMAGE DECODING METHOD

TECHNICAL FIELD

The present invention relates to an image coding apparatus, an image decoding apparatus, an image coding method, and an image decoding method that perform the transmission and storage of images with a small encoding data volume and that are applied to a mobile image transmission system or similar.

BACKGROUND ART

Conventional image coding systems are constituted to divide image frames into blocks of a fixed size and then perform coding processing in these divided units. Typical examples of conventional image coding systems include the MPEG (Moving Picture Experts Group) 1 coding system as described in Le Gall. D: "MPEG: A Video Compression Standard for Multimedia Applications", Trans. ACM, 1991, April.

MPEG 1 performs motion-compensated interframe prediction (MC: Motion Compensation) by dividing image frames into fixed block units known as macroblocks, detecting movement amounts (or motion vectors) by referencing a local decoding frame image encoded in units, specifying similar blocks from within a reference image and employing these similar blocks as predictive data. By means of this technique, even when there is motion in an image, the prediction efficiency can be improved by tracking the motion, and redundancy in a temporal direction can be reduced. Furthermore, redundancy that remains in a spatial direction can be reduced by employing the DCT (Discrete Cosine Transform), using units that are blocks consisting of 8×8 pixels, with respect to a prediction residual signal. A variety of standard image coding systems that start with MPEG1 perform data compression of image signals by combining MC and the DCT.

FIG. 20 is a block diagram showing the constitution of a conventional image coding apparatus based on an MPEG1 image coding system. An input image signal 1 which is inputted to the image coding apparatus shown in FIG. 20 is a temporal array of frame images and will subsequently embody the signal of each frame image unit. Further, an example of a frame image that is to be encoded is shown in FIG. 21. The current frame 601 is divided into fixed square/rectangular regions of 16 pixels×16 lines (called macroblocks), and the processing that follows is performed in these units.

The macroblock data of the current frame (current macroblocks) produced by the input image signal 1 are first outputted to a motion detection section 2 where detection of motion vectors 5 is carried out. A motion vector 5 is detected by referencing a predetermined search region of a previous encoded frame image 4 (called a local decoding image 4 hereinafter) stored in a frame memory 3, locating a pattern similar to the current macroblock (called a prediction image 6 hereinafter), and determining the amount of spatial displacement between this pattern and the current macroblock.

Here, the local decoding image 4 is not limited to only the previous frame. Rather, a future frame can also be used as a result of being encoded in advance and stored in the frame memory 3. Although the use of a future frame generates switching of the coding order and in turn an increase in the processing delay, there is the merit that variations in the image content produced between previous and future frames is easily predicted, thus making it possible to effectively reduce temporal redundancy still further.

Generally, in MPEG1, it is possible to selectively use three coding types which are called bidirectional prediction (B frame prediction), forward prediction (P frame prediction) that uses previous frames alone, and I frame prediction which does not perform interframe prediction, instead performing coding only within the frame. FIG. 21 is limited to P frame prediction alone, a local decoding image 4 being recorded with a previous frame 602.

The motion vector 5 shown in FIG. 20 is rendered by a two-dimensional parallel displacement amount. Block matching as represented in FIGS. 22A to 22D is generally used as the method of detecting the motion vector 5. A motion search range 603 centered on the spatial phase of the current macroblock is established, then, from the image data 604 within the motion search range 603 of the previous frame 602, the block for which the sum of the squares of the differences or the sum of the absolute values of differences is minimum is determined as the motion predictive data, and the relocation amount of the motion predictive data in relation to the current macroblock is determined as the motion vector 5.

The motion predictive data for all the macroblocks in the current frame is determined, and this data, which is rendered as a frame image, is equivalent to the motion prediction frame 605 in FIG. 21. The difference 606 between the motion prediction frame 605 shown in FIG. 21 obtained by way of the above MC processing, and the current frame 601, is obtained (obtained by the subtraction section 21 shown in FIG. 20), and this residual signal (called the prediction residual signal 8 hereinafter) undergoes DCT coding. Specifically, the processing to extract the motion predictive data for every macroblock (prediction image 6 hereinafter) is performed by a motion compensation section 7. The processing performed by the motion compensation section 7 involves using a motion vector 5 to extract the prediction image 6 from the local decoding image 4 stored in the frame memory 3.

The prediction residual signal 8 is converted into DCT coefficient data 10 (also called DCT coefficients 10 hereinafter) by a DCT section 9. As shown in FIG. 23, the DCT converts spatial pixel vectors denoted by 610 into a set of normalized orthogonal bases that render fixed frequency components denoted by 611. 8×8 pixel blocks ('DCT blocks' below) are normally adopted for the spatial pixel vectors. Because the DCT is discrete transform processing, the DCT actually performs conversion for each of the horizontal and vertical 8 dimensional row and column vectors of the DCT block.

The DCT uses the correlation between pixels present in a spatial region to localize the power concentration in the DCT block. The higher the power concentration, the better the conversion efficiency is, and therefore the performance of the DCT with respect to a natural image signal is not inferior when compared with a KL transform which is the optimum transform. Particularly in the case of a natural image, the power is concentrated in the lower regions including the DC component as a main part, and there is barely any power in the higher regions, and therefore, as shown in FIG. 24, by scanning from the lower regions to the higher regions as indicated by the arrows in the DCT block such that the quantized coefficients denoted by 612 are denoted by 613, and by including a large zero run, the overall coding efficiency which also includes the results of entropy coding is improved.

The quantization of the DCT coefficients 10 is performed by a quantization section 11 and the quantized coefficients 12 obtained thereby are scanned, run-length encoded, and multiplexed in a compressed stream 14 by a variable length coding section 13 before being transmitted. Further, the motion vectors 5 detected by the motion detection section 2 are also multiplexed in the compressed stream 14 and transmitted, one macroblock at a time, because these vectors are required in order to allow the image decoding apparatus described subsequently to generate a prediction image that is the same as that of the image coding apparatus.

In addition, the quantized coefficients 12 are decoded locally via a reverse quantization section 15 and a reverse DCT section 16, and the decoded results are added to the prediction image 6 by an addition section 22, whereby a decoding image 17 which is the same as that of the image decoding apparatus is generated. The decoding image 17 is used in the prediction for the next frame and is therefore stored in the frame memory 3.

A description is provided next for the constitution of a conventional image decoding apparatus that is based on an MPEG1 image decoding system as shown in FIG. 25. After receiving the compressed stream 14, the image decoding apparatus detects a sync word indicating the start of each frame by means of a variable length decoding section 18, and subsequently decodes motion vectors 5 and quantized DCT coefficients 12 in macroblock units. The motion vectors 5 are outputted to a motion compensation section 7d and the motion compensation section 7d extracts, as a prediction image 6, the image parts which have moved to an extent equivalent to the motion vectors 5, from a frame memory 19 (used in the same way as the frame memory 3), this operation being similar to the operation of the above-mentioned image coding apparatus. The quantized DCT coefficients 12 are decoded via a reverse quantization section 15d and a reverse DCT section 16d, and then added by the addition section 23 to the prediction image 6 to form the final decoding image 17. The decoding image 17 is outputted using predetermined display timing to a display device (not shown) where the image is played back.

DISCLOSURE OF THE INVENTION

However, in a conventional apparatus, MC performs movement amount detection based on the premise that all of the pixels in the blocks (referred to as MC blocks hereinafter and as macroblocks in the MPEG1 example above) which are the units of MC possess the same motion. Consequently, the possibility exists that, with a prediction image that is constituted by the spatial disposition of MC blocks, a signal waveform will arise in which discontinuity is perceived at the boundaries of the MC blocks. This discontinuous waveform can be compensated by supplementing the residual component in cases where an adequate encoding data amount is allocated to the residual signal. However, when coding is carried out with a high compression ratio, a satisfactory rendition of the residual signal is not possible and the discontinuous boundaries are sometimes apparent and perceived as distortion.

Further, it has been identified that, because the DCT is also a closed orthogonal transform in fixed blocks, in cases where the transform basis coefficients are reduced as a result of coarse quantization, the signal waveform which naturally connects between blocks cannot be reconstituted and unnatural distortion is generated between blocks (block distortion).

As means for solving the former MC block boundary discontinuity, overlapped motion compensation (called OBMC hereinafter) has been proposed. As illustrated by FIGS. 26A and 26B, OBMC is a technique according to which predictive data specified by the MC blocks' own motion vectors is added weighted with predictive data specified by motion vectors possessed by neighboring MC blocks, whereby the final predictive data is obtained.

In FIG. 26A, frame F(t) uses frame F(t−1) as a reference image and extracts predictive data in units of MC blocks (A to E, for example) from within the reference image. Normal MC employs this predictive data as is but OBMC extracts predictive data that corresponds to the position of block C by using the motion vectors MV(A), MV(B), MV(D), and MV(E) of the neighboring blocks A, B, D, and E shown in FIG. 26B, in determining the prediction image Pc of block C. In this extraction, P{C,MV(A)} signifies processing to extract predictive data for the position of C by using MV(A). The extracted predictive data are added weighted by W1 to W5 as per the following formula.

$Pc = W1 \times P\{C, MV(C)\} + W2 \times P\{C, MV(A)\} + W3 \times P\{C, MV(B)\} + W4 \times P\{C, MV(D)\} + W5 \times P\{C, MV(E)\}$ Here, the weight is normally set so that the influence of the original predictive data of block C becomes gradually smaller when moving from the center of the block C toward the block boundaries. Such processing affords the benefit that, because the prediction image is determined such that the movement amounts of neighboring regions overlap block C's own motion, the continuity of the waveform is preserved between the inner and outer pixels of the MC blocks and thus the boundaries thereof do not readily stand out.

However, with OBMC, there is the problem that, in addition to the extraction of predictive data for a block's own motion vectors, processing is also executed for all the MC blocks which includes processing to extract predictive data by means of motion vectors of neighboring MC blocks, and processing that involves the weighted addition of such data, meaning that the computational load is high.

Furthermore, in the movement amount detection involved in image coding, because detection is performed based on the criterion that the power of the prediction residual should be minimized beyond the movement amount that matches the natural movement of the subject, the problems exist that motion which is not based on true movement is sometimes detected in regions containing a lot of noise or in other locations, and that, in such locations, MC blocks are smoothed beyond what is necessary through the combined influence of neighboring movement amounts in OBMC, and two-line blurring is generated, and so forth.

On the other hand, as means for solving the latter DCT block distortion, a loop filter has been proposed. The loop filter acts as a smoothing filter for the boundaries of the DCT blocks of a decoding image that is obtained by adding a prediction residual signal, which has undergone encoding and local decoding, to a prediction image. This is a technique that does not introduce the effects of distortion, as caused by DCT quantization, to MC by removing block distortion from the reference image which is used for subsequent frames. However, so long as MC is limited to being performed in block units, the discontinuity between MC blocks will not necessarily be avoided. Further, there is the problem that in cases where residual coding which is not dependent on block structure such as subband coding or a block-spanning basis transform, or the like, is performed, coding efficiency disadvantages caused by the existence of a discontinuous waveform at block boundaries cannot be avoided.

The present invention was conceived in view of these problems, an object thereof being to provide an image coding apparatus, image decoding apparatus, image coding method, and image decoding method that make it possible to use relatively simple computation to perform processing, with respect to a prediction frame image generated by block-based motion-compensated interframe prediction (MC), to adaptively smooth a discontinuous waveform generated between MC blocks of the prediction frame image, whereby the efficiency of low bit rate coding that employs interframe MC can be improved.

In order to resolve the above problems, the image coding apparatus according to the present invention is characterized by comprising: motion compensation predicting means for generating a motion-compensated prediction image by detecting movement amounts in predetermined partial image region units of an input image; smoothing means for performing smoothing of pixels located at the boundaries of adjoining partial image regions on the basis of predetermined evaluation criteria, with respect to the prediction image obtained by the motion compensation predicting means; and prediction residual coding means for coding a prediction residual signal obtained from the difference between the input image and the smoothed prediction image.

Further, as the image decoding apparatus which corresponds to this image coding apparatus, the image decoding apparatus according to the present invention is characterized by comprising: motion compensation predicting means for generating a motion-compensated prediction image by detecting movement amounts in predetermined partial image region units; smoothing means for performing smoothing of pixels located at the boundaries of adjoining partial image regions on the basis of predetermined evaluation criteria, with respect to the prediction image obtained by the motion compensation predicting means; prediction residual decoding means for decoding a prediction residual signal from the encoding side; and adding means for obtaining a decoded image by adding together a decoded prediction residual signal obtained by the prediction residual decoding means, and the smoothed prediction image.

In addition, in order to resolve the above problems, the image coding method according to the present invention is characterized by comprising: a motion compensation predicting step of generating a motion-compensated prediction image by detecting movement amounts in predetermined partial image region units of an input image; a smoothing step of performing smoothing of pixels located at the boundaries of adjoining partial image regions on the basis of predetermined evaluation criteria, with respect to the prediction image obtained by the motion compensation predicting step; and a prediction residual coding step of coding the prediction residual signal obtained from the difference between the input image and the smoothed prediction image.

Further, as the image decoding method which corresponds to this image coding method, the image decoding method according to the present invention is characterized by comprising: a motion compensation predicting step of generating a motion-compensated prediction image by detecting movement amounts in predetermined partial image region units; a smoothing step of performing smoothing of pixels located at the boundaries of adjoining partial image regions on the basis of predetermined evaluation criteria, with respect to the prediction image obtained by the motion compensation predicting step; a prediction residual decoding step of decoding a prediction residual signal from the encoding side; and an adding step of obtaining a decoded image by adding together a decoded prediction residual signal obtained by the prediction residual decoding step, and the smoothed prediction image.

According to this constitution, smoothing is performed for pixels located at the boundaries of adjoining partial image regions on the basis of predetermined evaluation criteria, with respect to the prediction image, and it is therefore possible to perform correction in the direction in which only the smoothing processing, that corrects discontinuity in partial image regions, is allowed. It is therefore possible to improve the coding efficiency by suppressing discontinuous waveforms generated in the prediction residual. Accordingly, it is possible to use relatively straightforward computation to perform processing, with respect to a prediction frame image generated by block-unit motion-compensated interframe prediction (MC), to adaptively smooth a discontinuous waveform generated between MC blocks of the prediction frame image, whereby the efficiency of low bit rate coding that employs interframe MC can be improved.

BRIEF DESCRIPTION OF THE DRAWINGS

FIGS. 3A to 3G show the form of MC (motion-compensated interframe prediction) blocks;

FIGS. 10A and 10B show the appearance of pixels for processing which are between blocks that are adjoined in a lateral direction, in smoothing filter processing performed by another filter;

BEST MODES FOR CARRYING OUT THE INVENTION

Figure 1:
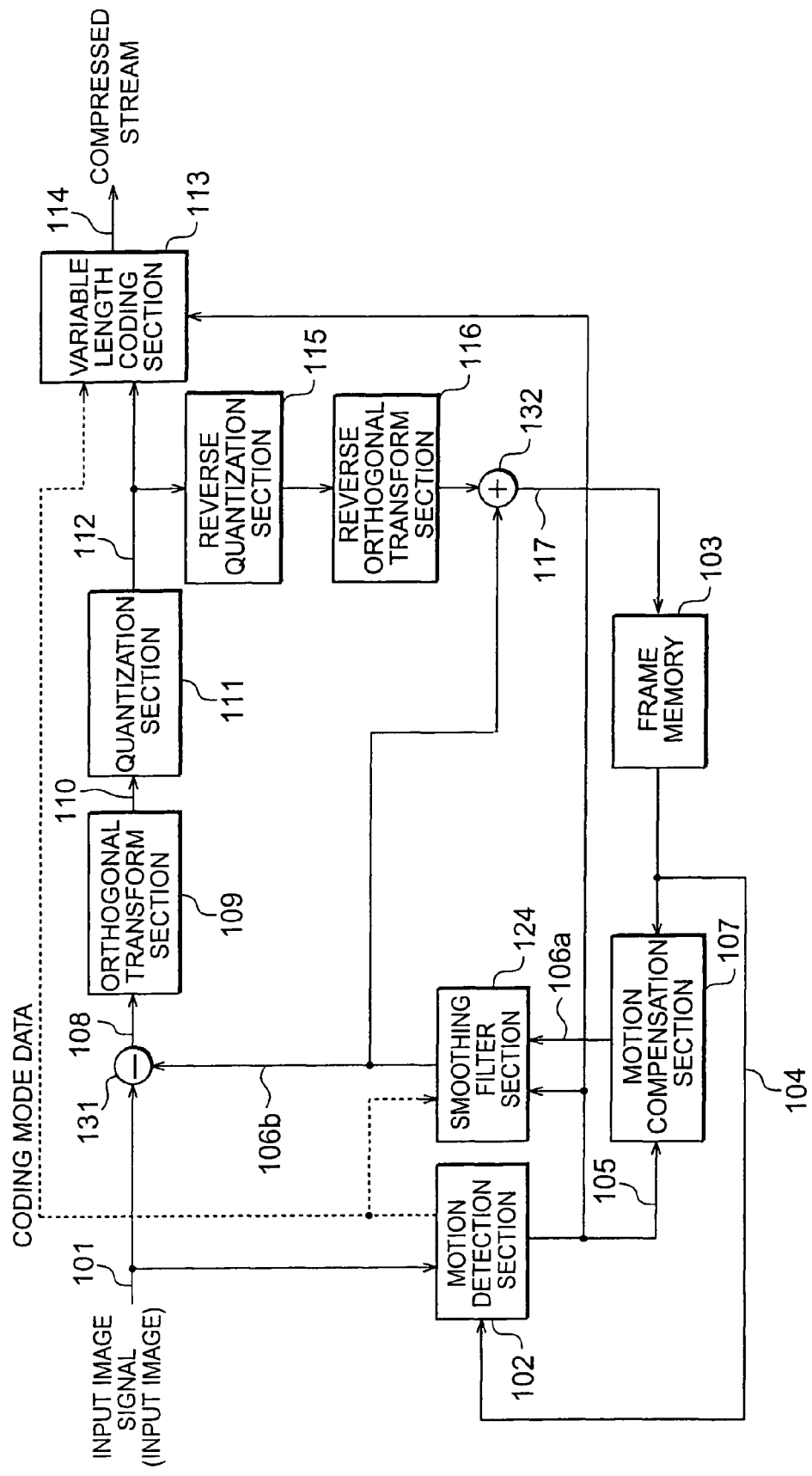
FIG. 1 is a block diagram showing the constitution of the image coding apparatus according to a first embodiment of the present invention.

Embodiments of the present invention will be described in detail hereinbelow by referring to the drawings.

First Embodiment

Figure 2:
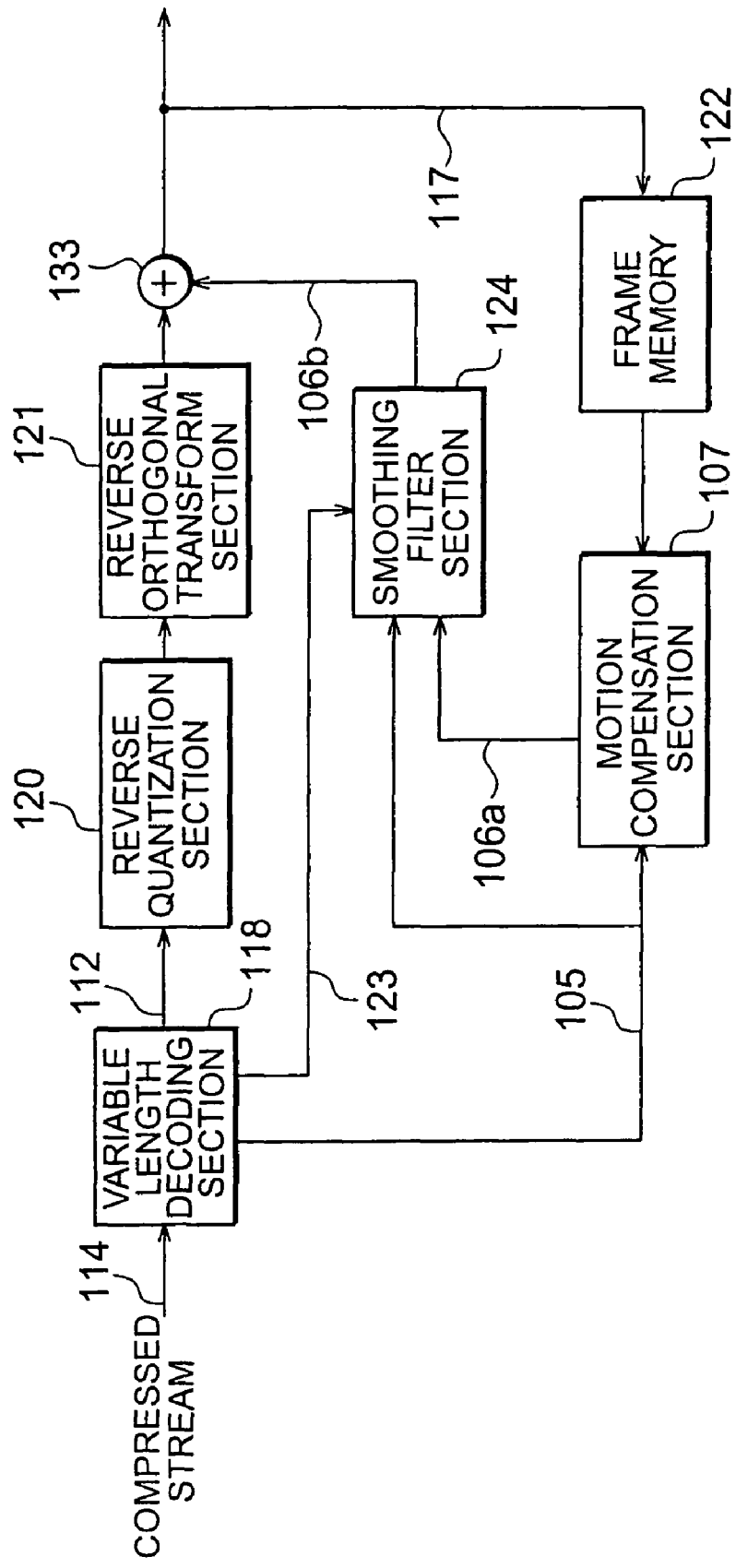
FIG. 2 is a block diagram showing the constitution of the image decoding apparatus according to the first embodiment.

FIG. 1 is a block diagram showing the constitution of the image coding apparatus according to the first embodiment of the present invention, and FIG. 2 is a block diagram showing the constitution of the image decoding apparatus. The image coding apparatus shown in FIG. 1 performs efficient image coding on account of being constituted to reduce redundancy in a temporal direction by means of MC, quantify spatial discontinuity between individual MC blocks with respect to the prediction image obtained by means of the MC, and adaptively perform smoothing filter processing in accordance with the conditions.

Figure 21:
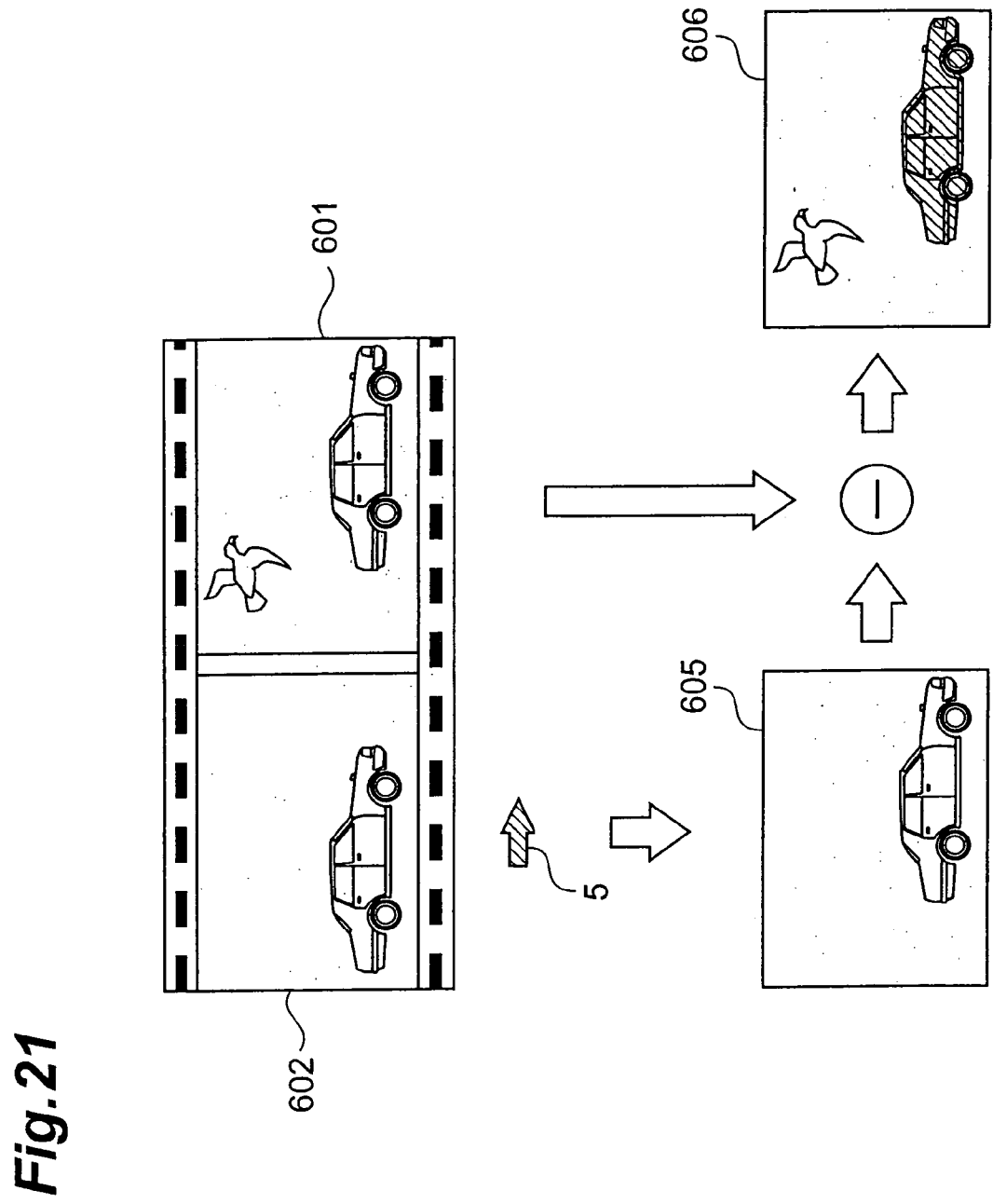
FIG. 21 is a conceptual view of motion-compensated frame prediction.
Figure 22A:
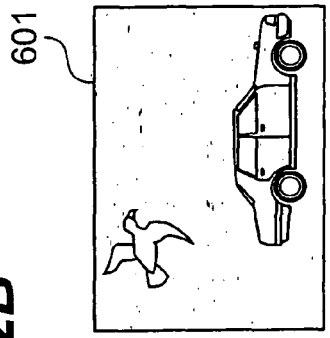
FIGS. 22A to 22D are conceptual views of motion compensation by means of block matching.
Figure 22B:
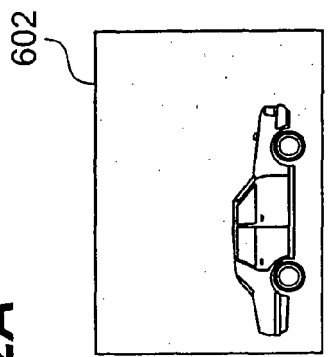
Figure 22D:
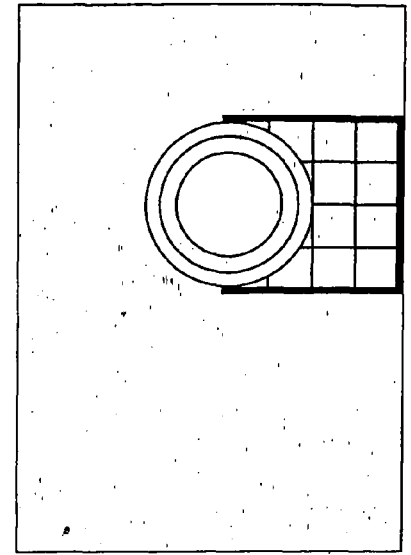
Figure 22C:
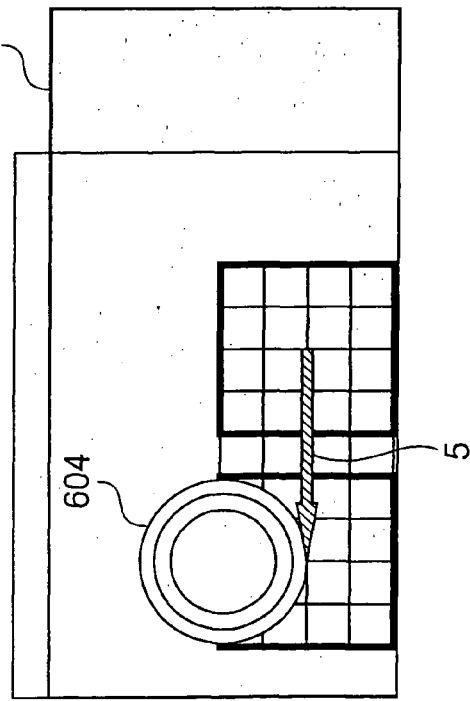
Figure 23:
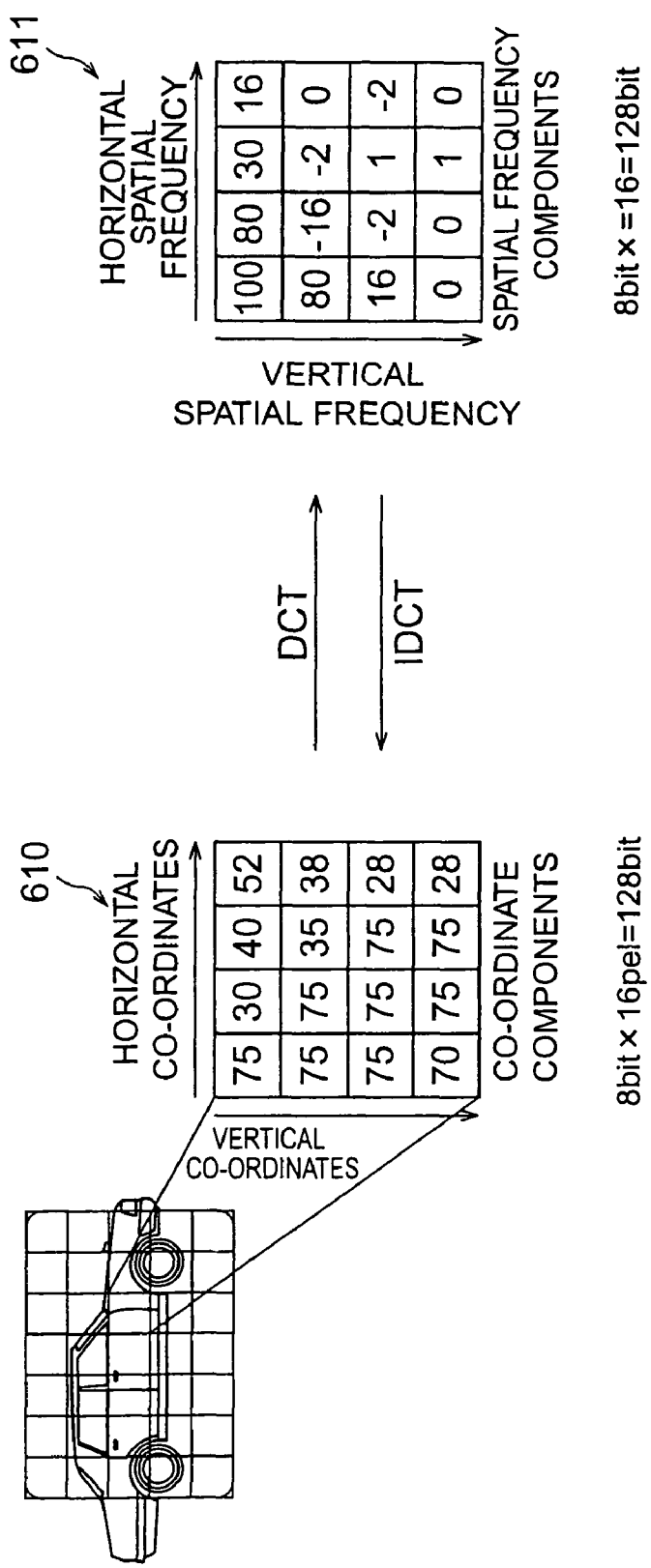
FIG. 23 is a conceptual view of the Discrete Cosine Transform.

The MC procedure of this image coding apparatus is substantially the same as the method described in the conventional example. An outline of this procedure is provided in FIG. 21 and an outline of the block matching processing employed in the motion vector detection is as shown in FIGS. 22A to 22D. However, the MC blocks can be defined by uniformly divided units into which macroblocks are divided into a variety of rectangular regions as shown by MC modes 1 to 7 in FIGS. 3A to 3G, and identification data indicating which MC block shape is used is transmitted as coding mode data.

For example, in MC mode 1 shown in FIG. 3A, in order to make a macroblock into an MC block, one motion vector is established for the macroblock. On the other hand, in MC mode 2 shown in FIG. 3B, regions produced by dividing the macroblock into lateral halves are MC blocks, meaning that two motion vectors per macroblock are established. Similarly, in MC mode 7 shown in FIG. 3G, 16 motion vectors per macroblock are established.

Figure 24:
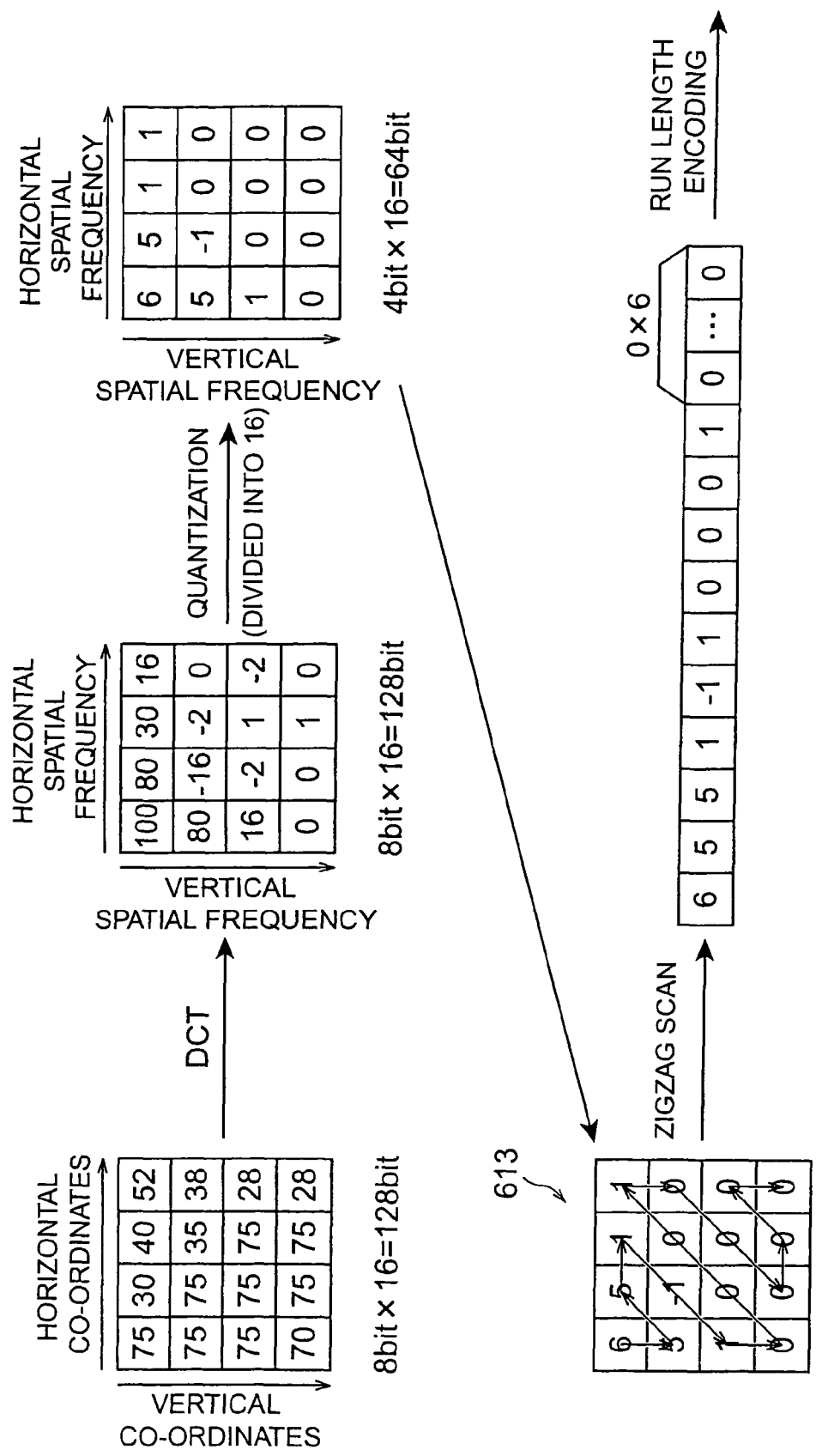
FIG. 24 is an illustrative view of quantization and run length encoding.
Figure 25:
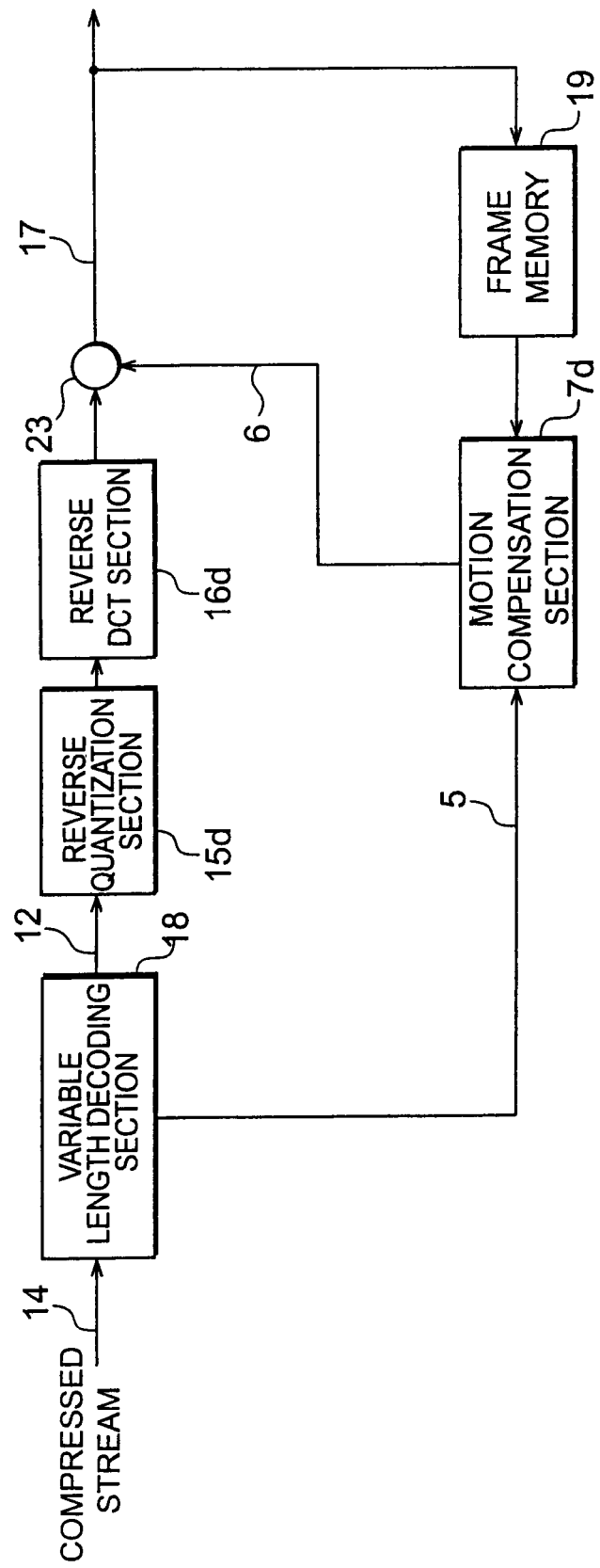
FIG. 25 is a block diagram showing the constitution of a conventional image decoding apparatus based on an MPEG1 image decoding system.
Figure 26B:
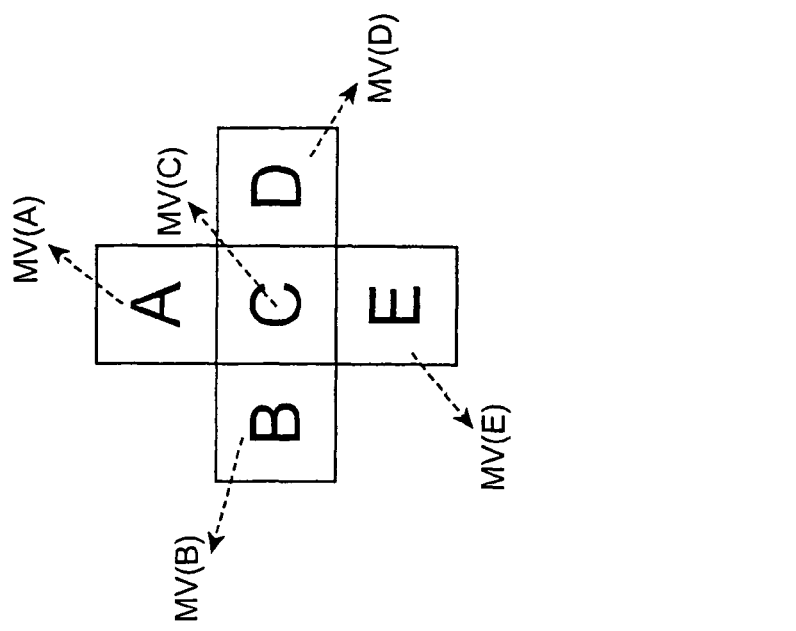
FIGS. 26A and 26B are illustrative views of OBMC (overlapped motion compensation).
Figure 26A:
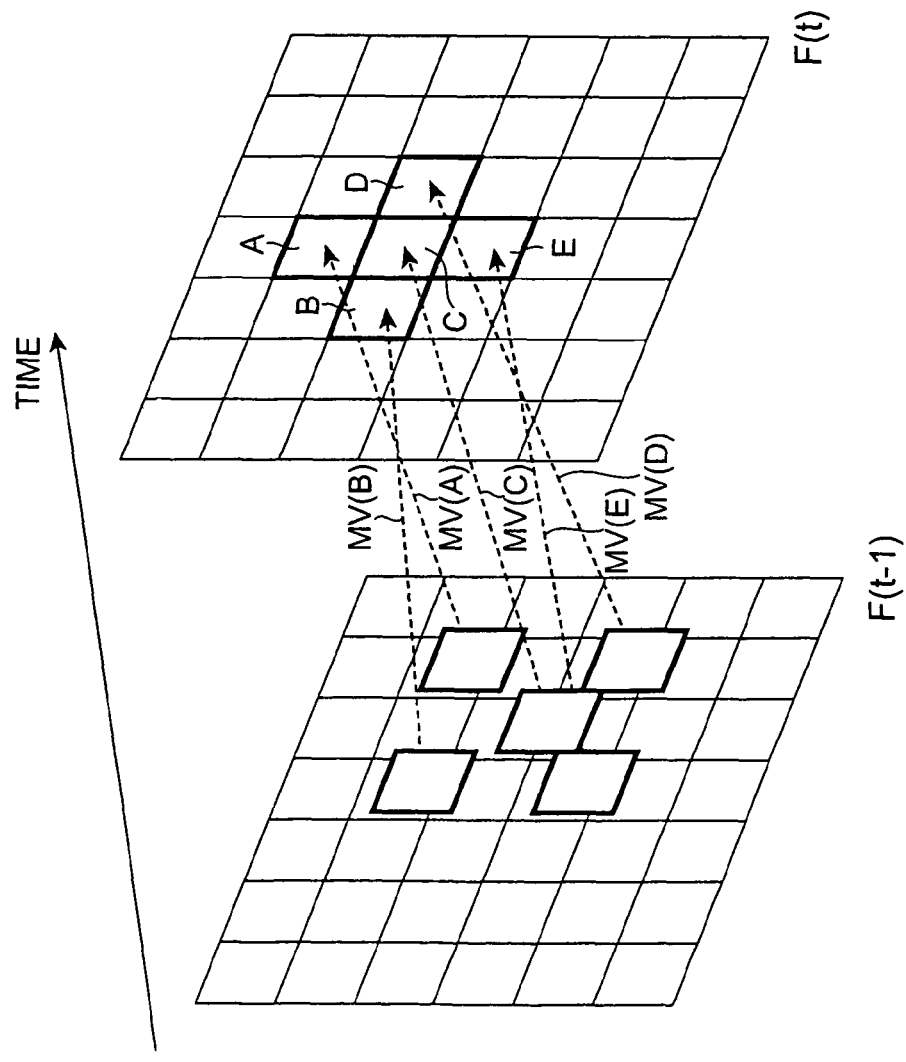

A procedure that involves performing an orthogonal transform with respect to a residual signal obtained from the difference between an input image and a prediction image which has undergone smoothing processing, and then quantizing and entropy coding the corresponding coefficients, is also as described with reference to FIG. 24 in the conventional example.

The operation of the image coding apparatus and image decoding apparatus shown in FIGS. 1 and 2 respectively will be described below with reference to the drawings and will be centered on the smoothing filter processing which is a particular feature of the present embodiment.

The operation of the image coding apparatus will be described first. The input image signal 101 is a temporal array of frame images and will subsequently embody the signal of a frame image unit. A frame image that is to be encoded is the current frame 601 shown in FIG. 21.

The current frame is encoded by means of the following procedure. The input image signal 101 is inputted to a motion detection section 102 one macroblock at a time, and motion vectors 105 are detected in the motion detection section 102. Of the macroblock forms shown in FIGS. 3A to 3G, the form which affords the best coding efficiency is selected for the MC block which is the motion-vector assigned unit. The motion compensation section 107 uses the motion vectors 105 to reference a reference image 104 (encoded and locally decoded frame image) which is stored in the frame memory 103 and then extracts a prediction image 106a for the macroblocks.

Although the motion detection section 102 and the motion compensation section 107 perform processing for every one of the macroblocks, the signal for the difference with respect to the input image signal 101 (the prediction residual signal 108) is obtained with the frame as the unit. That is, the motion vectors 105 of individual macroblocks are maintained over the entire frame, whereby the prediction image 106a is constituted as a frame-unit image.

Next, smoothing processing between MC blocks of the prediction image 106a is performed in the smoothing filter section 124. The details of this processing will be described in detail subsequently. The smoothed prediction image 106b is subtracted from the input image signal 101 by the subtraction section 131, and, as a result, the prediction residual signal 108 is obtained. The prediction residual signal 108 is converted into orthogonal transform coefficient data 110 by the orthogonal transform section 109. A DCT is used for example in the orthogonal transform. The orthogonal transform coefficient data 110 passes through a quantization section 111, and is scanned and run-length encoded by the variable length coding section 113, before being multiplexed and transmitted in a compressed stream 114 by same.

Thereupon, coding mode data 123 that indicates whether intraframe coding or interframe coding has been performed, which is determined one macroblock at a time, is also multiplexed. In an inter mode case, motion vectors 105 are multiplexed and transmitted in a compressed stream 114 one macroblock at a time. Further, quantized coefficients 112 are locally decoded via a reverse quantization section 115 and a reverse orthogonal transform section 116, and the decoded result is added to the prediction image 106b by an addition section 132 to thereby generate a decoding image 117 which is the same as that on the image decoding apparatus side. The decoding image 117 is stored in the frame memory 103 to be used as a reference image 104 for the prediction of the next frame.

Next, the operation of the image decoding apparatus will be described with reference to FIG. 2. After the compressed stream 114 has been received by the image decoding apparatus, the variable length decoding section 118 detects a sync word that represents the start of each frame, whereupon coding mode data 123, motion vectors 105 and quantized orthogonal transform coefficients 112 are decoded in macroblock units. The motion vectors 105 are outputted to the motion compensation section 107, and the motion compensation section 107 extracts, as the prediction image 106a, the image parts which have moved to an extent equivalent to the motion vectors 105 from a frame memory 122 (used in the same way as the frame memory 103), this operation being similar to the operation of the image coding apparatus.

The prediction image 106a passes through the smoothing filter section 124 and is then outputted as the smoothed prediction image 106b. The quantized orthogonal transform coefficients 112 are decoded via a reverse quantization section 120 and a reverse orthogonal transform section 121, and then added by an addition section 133 to the prediction image 106b to form the final decoded image 117. The decoded image 117 is stored in the frame memory 122 and outputted to a display device (not shown) with predetermined display timing, whereby the image is played back.

Figure 4:
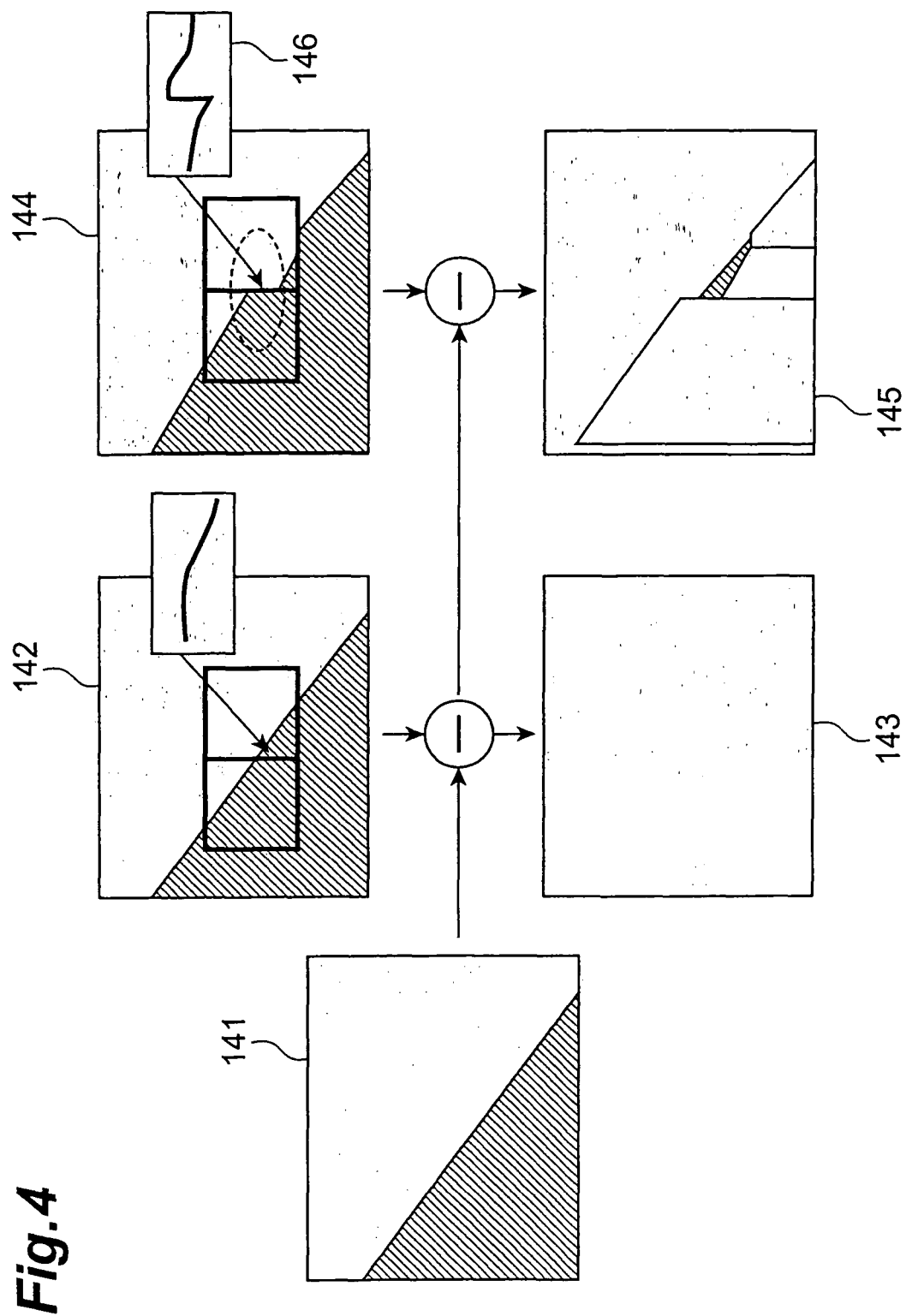
FIG. 4 serves to illustrate the problems posed with block unit MC.

Next, the operation of the smoothing filter section 124 will be described. First, the grounds for the need for the smoothing filter will be described with reference to FIG. 4. FIG. 4 shows an input image 141, a prediction image 142 in which no discontinuity between MC blocks is generated as well as a prediction residual image 143 which uses the prediction image 142, and a prediction image 144 in which discontinuity between MC blocks is generated as well as a prediction residual image 145 which uses the prediction image 144. Motion vectors are detected with MC blocks as units by means of a motion detection algorithm of a general image coding system such a block matching algorithm or the like.

That is, all the pixels contained the MC blocks possess the same movement amount. Generally, in block unit MC, motion vectors which afford the greatest reduction in the prediction residual for the MC blocks are detected, meaning that no consideration is given to spatial continuity with adjoining MC blocks. For this reason, as shown in FIG. 4, a discontinuous waveform 146 is sometimes produced between MC blocks. This discontinuous waveform 146 remains in the residual signal and is a signal subjected to encoding. Here, in order to exercise caution, the orthogonal transform itself is performed only within the above MC block and therefore has no influence on the coding of the frame.

However, in cases where, in the prediction residual coding of this frame, such a specific waveform cannot be adequately encoded, the waveform component remains in the local decoding image and appears within the MC blocks in the prediction image of subsequent frames. This sometimes influences the coding efficiency of the prediction residual signal. In a natural image, the boundaries of the original MC blocks should be smoothly linked, and, based on this assumption, the processing performed by the smoothing filter section 124 has as an object to obtain a prediction image which is close to being a natural image by smoothing any discontinuous waveforms present between MC blocks.

Figure 5:
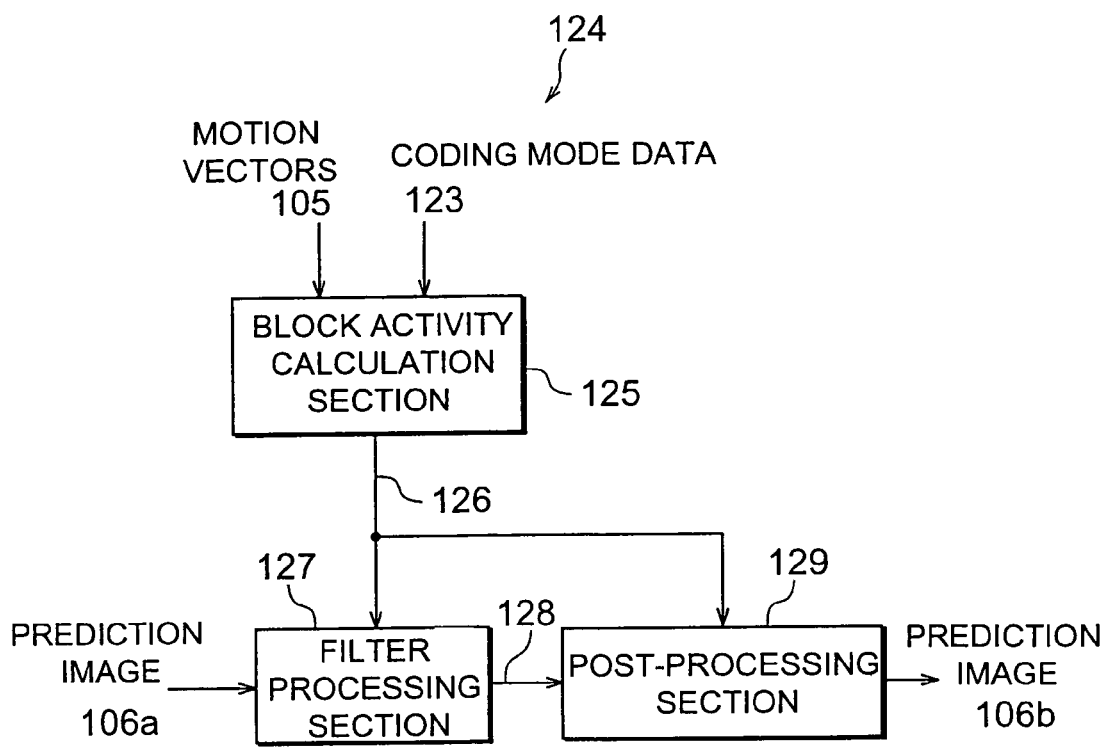
FIG. 5 is a block diagram showing the constitution of a smoothing filter section of the first embodiment.
Figure 6:
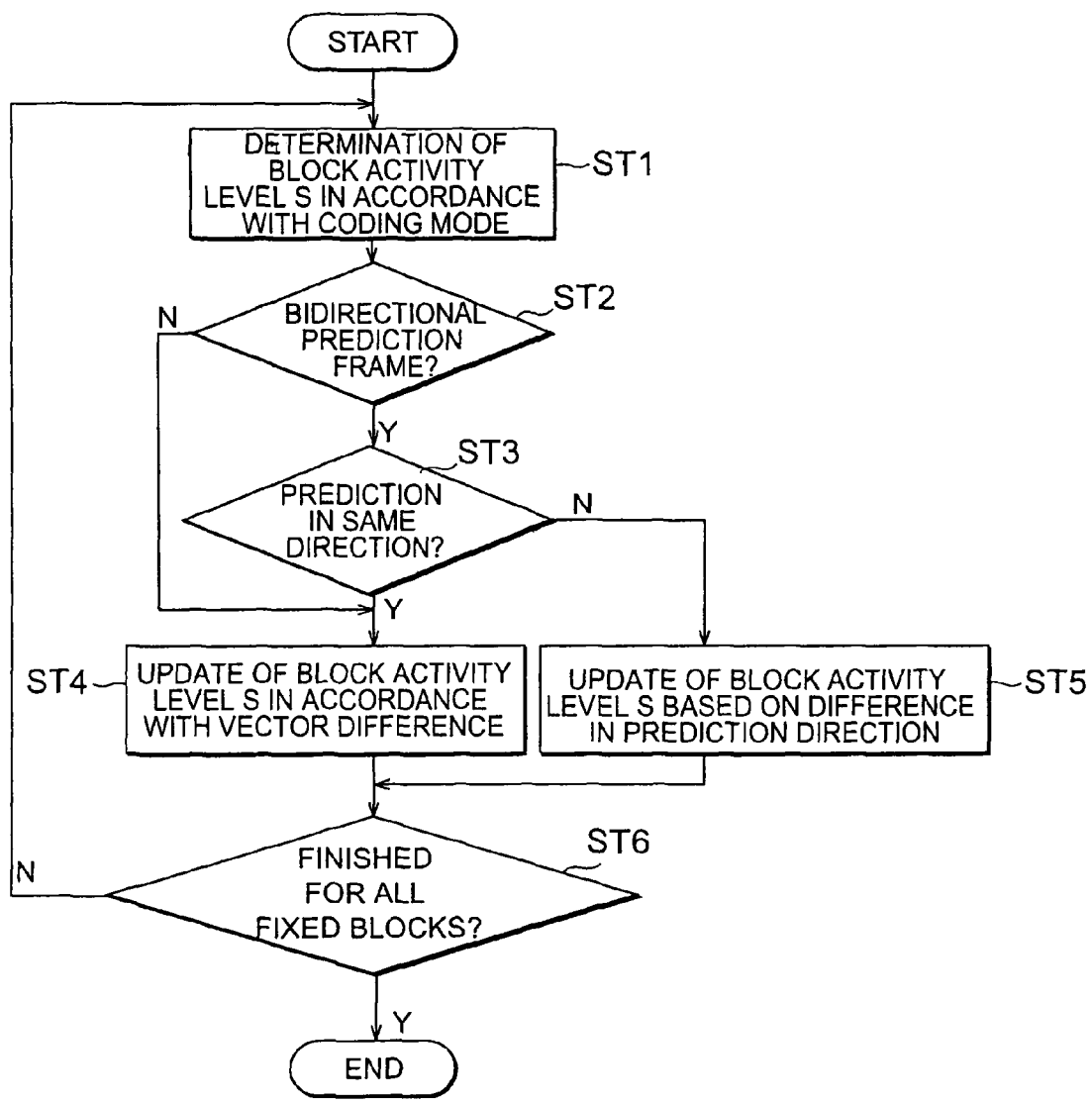
FIG. 6 is a flowchart serving to illustrate the computational processing operation of the block activity level calculation section of the smoothing filter section.
Figure 7:
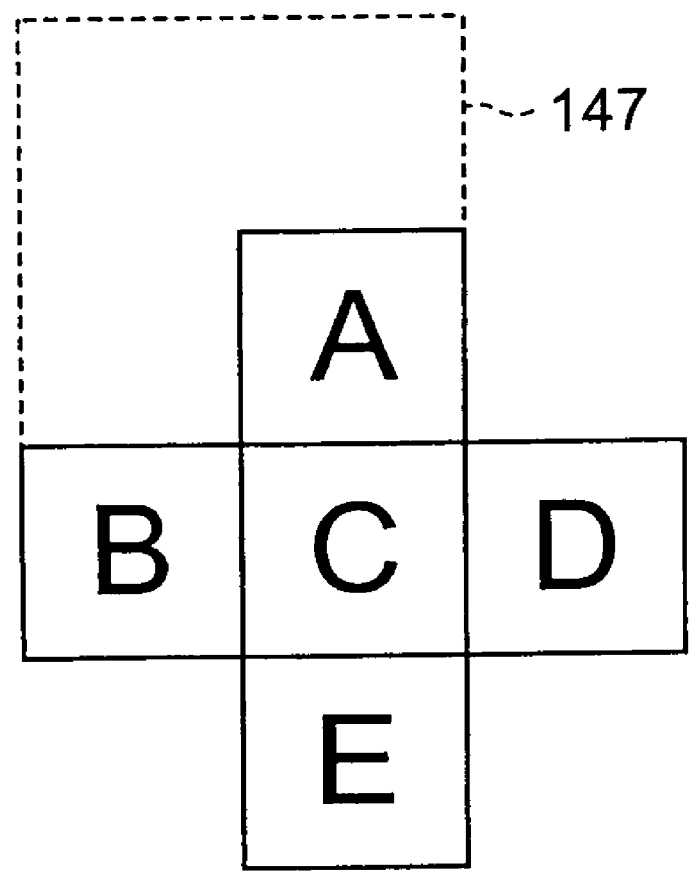
FIG. 7 shows an example of a unit for determining the block activity level.

The constitution of the smoothing filter section 124 is shown in FIG. 5 and will now be described. First, a block activity level calculation section 125 determines a block activity level S(X) in units of fixed blocks X in the prediction image 106a. The flow of the processing by the block activity level calculation section 125 is shown in FIG. 6. The determination of S(X) is based on the relationship with the neighboring blocks as shown in FIG. 7. Here, the blocks A to E are units for determining the block activity level and are not necessarily the same as the MC blocks. For example, the fact that block A is one part of a larger MC block 147 is shown. In other words, the block activity level is directed toward blocks of fixed size that bear no relation to the size of the MC blocks shown in FIGS. 3A to 3G. First, S(X) is set to a predetermined initial value S0 (zero, for example) over the whole area of the frame. Then, when the coding mode data 123 of macroblocks including block C indicate the intra mode, the block activity level S(X) is determined in accordance with the following Rule 1 (step ST1).

(Rule 1)
(1) current S(A) is updated to max {S(A), S0+1}
(2) current S(B) is updated to max {S(B), S0+1}
(3) current S(C) is updated to max {S(C), S0+2}
(4) current S(D) is updated to max {S(D), S0+1}
(5) current S(E) is updated to max {S(E), S0+1}

Therefore, the block activity level in the vicinity of the block to be intra coded is set high. The resolution of the prediction image in intra coding is generally lower than that of a prediction image produced by inter coding and hence the boundaries of blocks among macroblocks of intra mode stand out easily. The provision of step ST1 is equivalent to raising the priority of smoothing processing in such regions.

A description will be provided next for the rule for setting S(X) when the coding mode data 123 of macroblocks including block C indicates inter coding. First, it is judged whether or not the current prediction image was generated using bidirectional prediction (the B frame prediction mentioned in the conventional example) (step ST2).

In cases where bidirectional prediction can be used, the prediction direction can be changed for each of the macroblocks. When the prediction direction differs between blocks, spatial continuity at the boundaries of both blocks cannot be assumed. That is, a judgment is made of whether or not the prediction direction of blocks A, B, D, and E, which adjoin block C, is the same, and processing is then switched (step ST3).

When only unidirectional prediction is used or when the frame permits bidirectional prediction and the prediction direction for block C is the same, the block activity level is updated in accordance with Rule 2 below (step ST4).

(Rule 2)
(1) If macroblocks including block A are of an inter mode,
 current S(A) is updated to max {S(A), K} and
 current S(C) is updated to max {S(C), K}.
 Here,
 K=2 (when mvd(A,C)≧3)
 K=1 (when 0<mvd(A,C)<3)
 K=0 (when mvd(A,C)=0)
(2) If macroblocks including block B are of an inter mode,
 current S(B) is updated to max {S(B), K} and
 current S(C) is updated to max {S(C), K}.
 Here,
 K=2 (when mvd(B,C)≧3)
 K=1 (when 0<mvd(B,C)<3)
 K=0 (when mvd(B,C)=0)
(3) If macroblocks including block D are of an inter mode,
 current S(D) is updated to max {S(D), K} and
 current S(C) is updated to max {S(C), K}.
 Here,
 K=2 (when mvd(D,C)≧3)
 K=1 (when 0<mvd(D,C)<3)
 K=0 (when mvd(D,C)=0)
(4) If macroblocks including block E are of an inter mode,
 current S(E) is updated to max {S(E), K} and
 current S(C) is updated to max {S(C), K}.
 Here,
 K=2 (when mvd(E,C)≧3)
 K=1 (when 0<mvd(E,C)<3)
 K=0 (when mvd(E,C)=0)
(5) If blocks A, B, D, and E are intra coded, the block activity level thereof is not changed.

In the above rule, mvd (X,Y) indicates the large value of the differential values for the components of motion vectors of adjoining blocks X and Y. Further, max (a,b) indicates the larger value of the values a and b. By updating the above block activity level, a high block activity level can be provided between blocks exhibiting a marked motion vector difference.

When mvd (X, Y)=0 (when there is no motion vector difference between blocks X and Y), this represents a case where the block boundary retains complete spatial continuity and there is thus no need for smoothing here. The block activity level is therefore set to a minimum value.

On the other hand, in a frame permitting the use of bidirectional prediction and when the direction of the prediction for the blocks A, B, D, E is different in relation to block C, or in a mode that combines prediction images by adding and averaging the prediction values in forward and backward directions, the spatial continuity of the prediction image is broken irrespective of the motion vector difference, and hence the current S(X) is updated (step ST5) to max {S(X),1} (X represents blocks A to E). The above processing is performed until completed for all the fixed blocks X in the frame (step ST6), and the setting of the block activity level S(X) 126 is thus completed.

Figure 8:
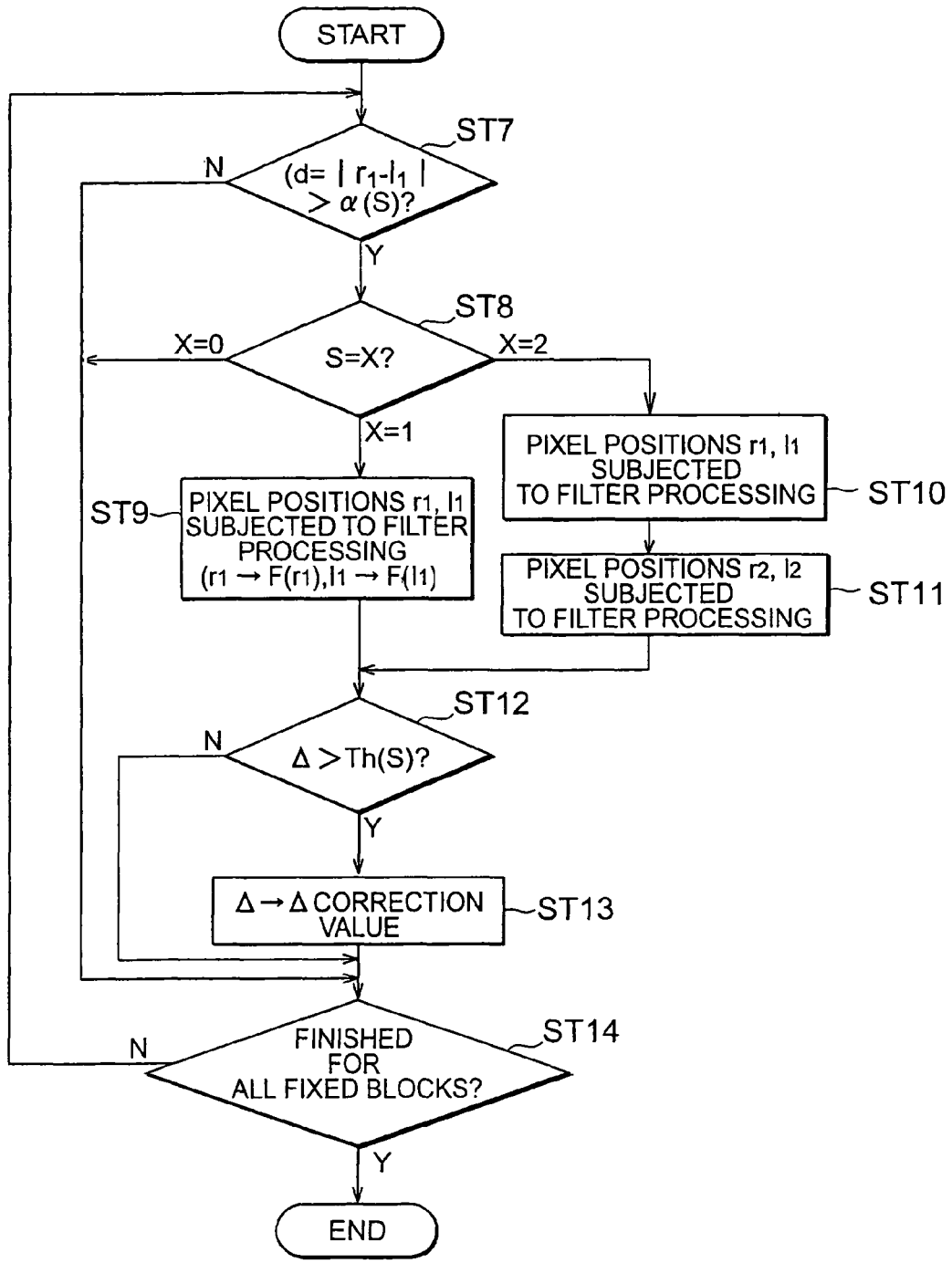
FIG. 8 is a flowchart to illustrate the operation of the processing to correct futile filter processing in the smoothing filtering performed by the filter processing section of the smoothing filter section.

By using the block activity level S(X) 126 set by the block activity level calculation section 125, smoothing processing between MC blocks is performed for the prediction image 106a in the filter processing section 127. In the filter processing process, futile filter processing is corrected in the post-processing section 129 so that the results 128 of performing smoothing filtering once do not produce excessive smoothing. The process for this processing is shown in the flowchart of FIG. 8, and the state of pixels to be processed between laterally adjoining blocks is shown in FIG. 9 and will now be described.

Figure 9:
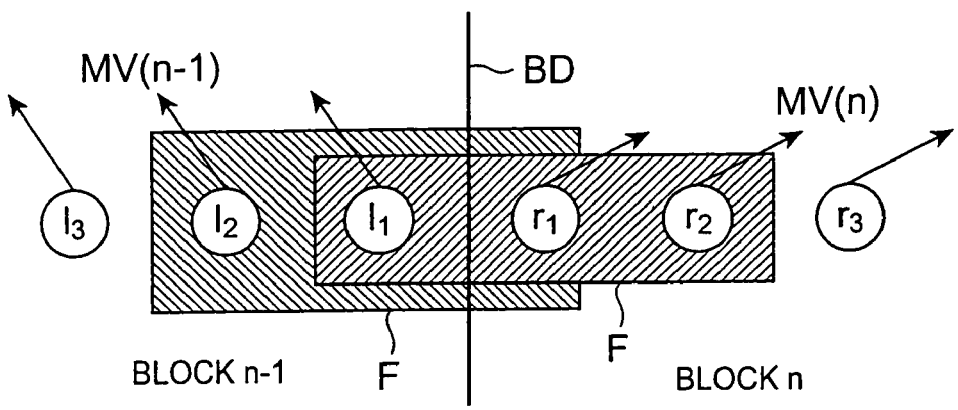
FIG. 9 shows the appearance of pixels for processing which are between blocks that are adjoined in a lateral direction, in smoothing filter processing.

That is, in FIG. 9, the pixels $r_1$ to $r_3$ are contained in block n and the pixels $l_1$ to $l_3$ are contained in block n−1 which adjoins block n on the left. In the description that follows, the assumption is made that block n and block n−1 possess mutually different vectors MV (n) and MV (n−1) respectively and that an MC block boundary BD lies between $r_1$ and $l_1$. The definition is also the same for pixels to be processed between vertically adjoining blocks.

First, it is judged whether or not the magnitude of the block boundary difference value $d=|r_1-l_1|$ (here, $r_1$, $l_1$ represent the pixel values of the respective pixels $r_1$, $l_1$) exceeds a threshold value $\alpha(S)$ established in accordance with the block activity level S (step ST7). In the filter processing below, processing is performed for two block boundaries and therefore, the larger value of the values of S(X) for the two blocks processed is used as the block activity level S. For example, when filtering is performed on the boundaries of block B and block C in FIG. 7, if S(B)>S(C), the value of S(B) is used as the block activity level S. When the differential value d is equal to or less than the threshold value $\alpha(S)$, filter processing is not performed in the pixel regions of $r_1$ to $r_3$, and $l_1$ to $l_3$. On the other hand, when the differential value d exceeds the threshold value $\alpha(S)$, filter processing is performed by switching the pixel region to be filtered, in accordance with S (step ST8).

Figure 10A:
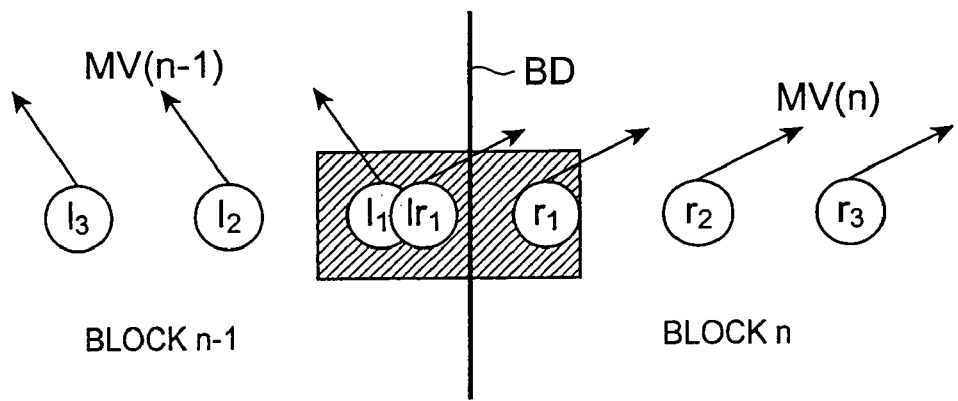
Figure 10A:
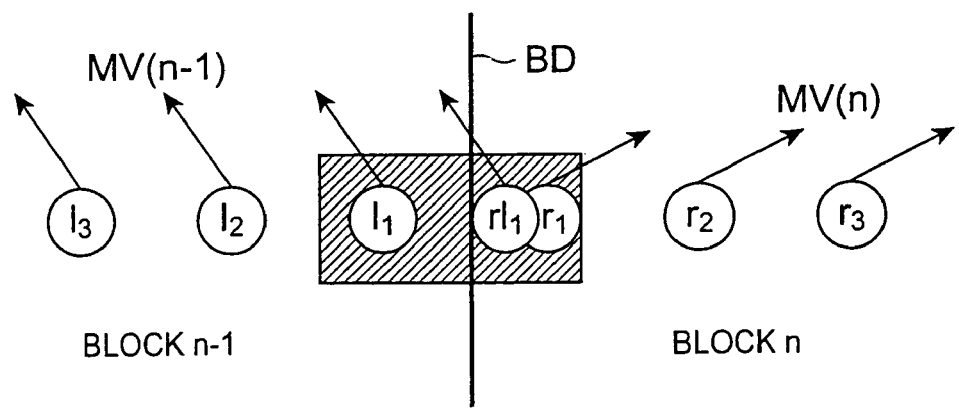

As a result, if S=0, there is no discontinuity at the block boundaries and so the filter processing is skipped. If S=1, filter processing is performed for the two pixels which are pixels $r_1$ and $l_1$ (step ST9). As shown in FIG. 9, for example, there are methods including one where the filter processing employs a low pass filter F constituted to use three points, which are the pixels $r_1$, $l_1$, and $r_2$, for pixel $r_1$, and to use three points, which are the pixels $l_1$, $l_2$, and $r_1$, for pixel $l_1$, but any given filter can be used. For example, a 5-tap filter, which has the pixels $r_1$ or $l_1$ at the center and which uses two pixels to the left and right (or above and below) thereof respectively, may be employed. As a further example of a filter, constitutions may also be considered such as a constitution in which, as shown in FIG. 10A, when pixel $l_1$ is filtered, pixel $r_1$ and prediction pixel value $lr_1$ of the positions of pixel $l_1$ which is extracted by means of the vector MV (n) of pixel $r_1$, is employed, and, as shown in FIG. 10B, when pixel $r_1$ is filtered, pixel $l_1$ and prediction pixel value $rl_1$ of the positions of $r_1$ which is extracted by means of the vector MV (n−1) of pixel $l_1$, is employed. The prediction pixel value $lr_1$ and $rl_1$ are pixel values which are spatially linked from the start to the pixels $r_1$ and $l_1$ in a reference image region in the frame memory, which makes more natural smoothing of block boundaries possible.

When S=2, in addition to the pixels $r_1$ and $l_1$, pixels $r_2$ and $l_2$ are pixels that are targeted for smoothing (steps ST10 and ST11). In cases where S=2, there are often steep and discontinuous boundaries due to the high block activity level, and hence the object is to increase the continuity of the signal by increasing the extent of the smoothing.

The above processing is carried out in a filter processing section 127. The prediction pixel value 128 produced by filter processing is corrected so as to be effective in the coding efficiency of a post-processing section 129. The processing of the post-processing section 129 is equivalent to steps ST12 and ST13 in FIG. 8. The post-processing section 129 controls the differential value Δ between the pixel value before filtering and the pixel value after filtering by means of a threshold value Th(S) established in accordance with the block activity level S.

Figure 11:
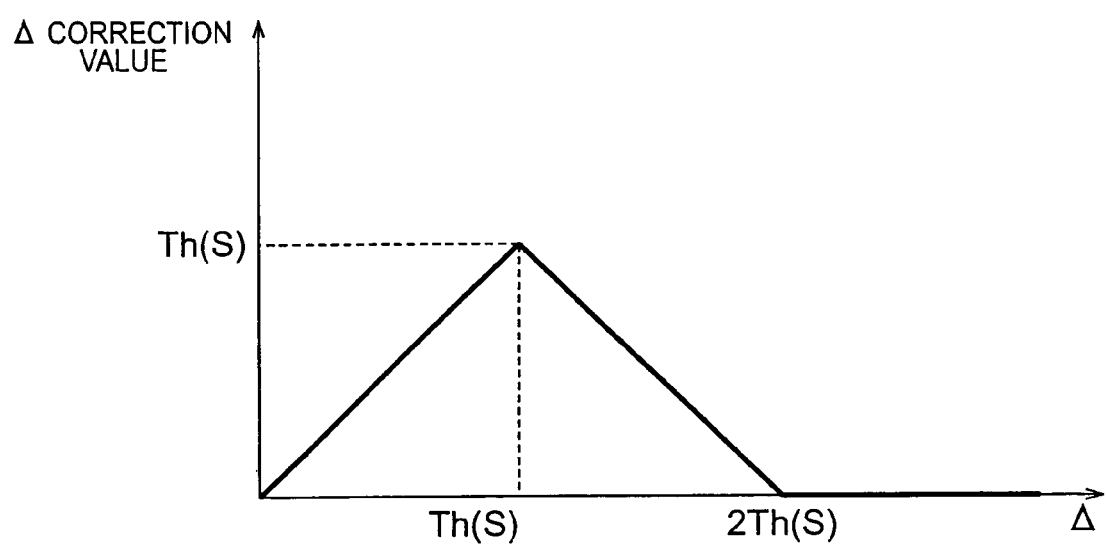
FIG. 11 shows the function established in the post-processing section of the smoothing filter section.

Specifically, the functions shown in FIG. 11 (horizontal axis: Δ, vertical axis: Δ correction value) are established and the correction value is determined. Here, the threshold value Th(S) is the maximum permissible differential value, and in cases where a Δ that is equal to or more than this value is produced, correction is applied in the difference-diminishing direction in accordance with the size of this value. In cases where Δ is equal to or more than the threshold value Th(S), the assumption is made that the difference obtained by filtering is not attributable to MC block discontinuity but instead is the result of filtering with respect to an edge component that was originally present in the image.

Therefore, according to the image coding apparatus and image decoding apparatus according to the first embodiment, it is possible to perform correction in the direction in which only filtering to correct MC block discontinuity is allowed, by means of the above corrective measures performed by the smoothing filter section 124. The prediction image 106b is outputted via the above processing and it is therefore possible to improve the coding efficiency by suppressing discontinuous waveforms generated in the prediction residual.

When setting the block activity level in FIG. 7, in inter mode, the block activity level is determined up to correspond to the range of values of mvd (X, Y), but the method used to determine this range is optional. More particularly, the block activity level in an inter mode case may be determined using only the criterion that mvd (X, Y) should be zero or not zero. Further, since it can be said that the smaller the motion vector-assigned units in the variety of MC block forms shown in FIGS. 3A to 3G become and the larger the number of motion vectors per macroblock becomes, the more intense the motion in the macroblock and in the vicinity thereof becomes, the block activity level may be set based on the criterion that any of the MC modes 1 to 7 shown in FIGS. 3A to 3G should be selected.

Furthermore, this smoothing filter processing can also be constituted so that same can be turned ON/OFF in frame units. The processing itself of the smoothing filter section 124 is processing to change prediction image data selected optimally in MC block units, and therefore this processing can also have an adverse effect as well as a good effect on the coding efficiency. Thus, image analysis in frame units is performed by the image coding apparatus. It is judged beforehand whether or not motion causing discontinuity between MC blocks is present, and the smoothing filter section 124 is turned ON when discontinuity is generated and turned OFF in the absence of discontinuity.

Examples of image analysis include the evaluation of a provisional residual between the input image signal 101 and the prediction image 106*a*. The signal distribution of the residual is viewed and, because residual coding processing does not require smoothing filter processing in frames that are not particularly disadvantageous, the filter is turned OFF, but the filter is turned ON for frames that are significantly disadvantageous. For example, consideration may be given to operation such that in cases where the proportion of the residual signal amount at the MC boundaries in relation to the overall residual signal amount is equal to or more than a certain fixed threshold value, the filter is turned ON, and when this proportion is equal to or less than a threshold value, the filter is turned OFF. Alternatively, there are also methods in which a determination of whether to turn the filter ON or OFF is made after the frame unit coding efficiency has been compared in cases where smoothing processing is and is not performed. The result of the ON/OFF determination is transmitted as a portion (bit data that indicates the presence or absence of smoothing) of the header information of the start of a frame in the compressed stream 114. By means of such a constitution, smoothing processing can be applied more adaptively for an irregular image signal.

Second Embodiment

Figure 12:
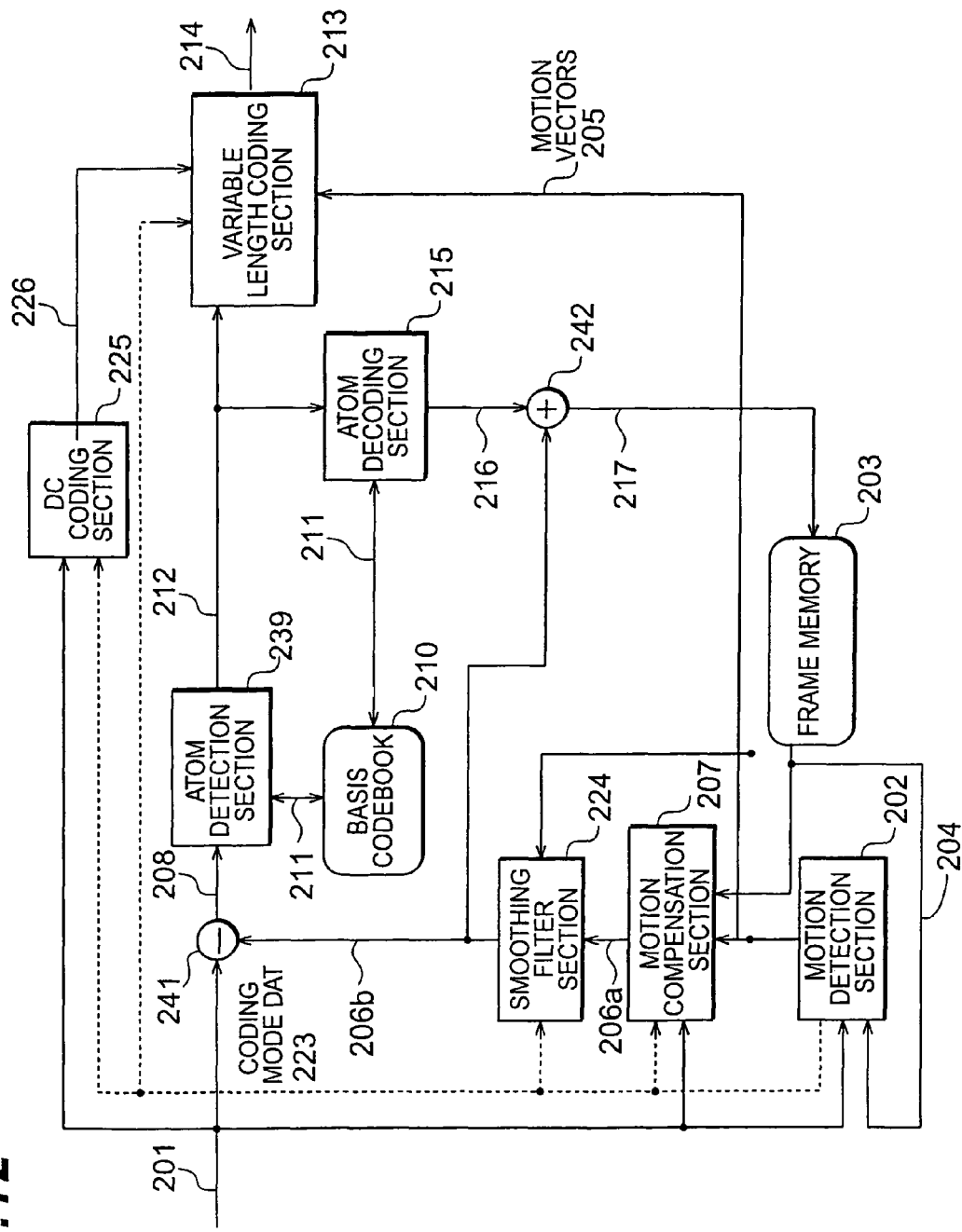
FIG. 12 is a block diagram showing the constitution of the image coding apparatus according to a second embodiment of the present invention.
Figure 13:
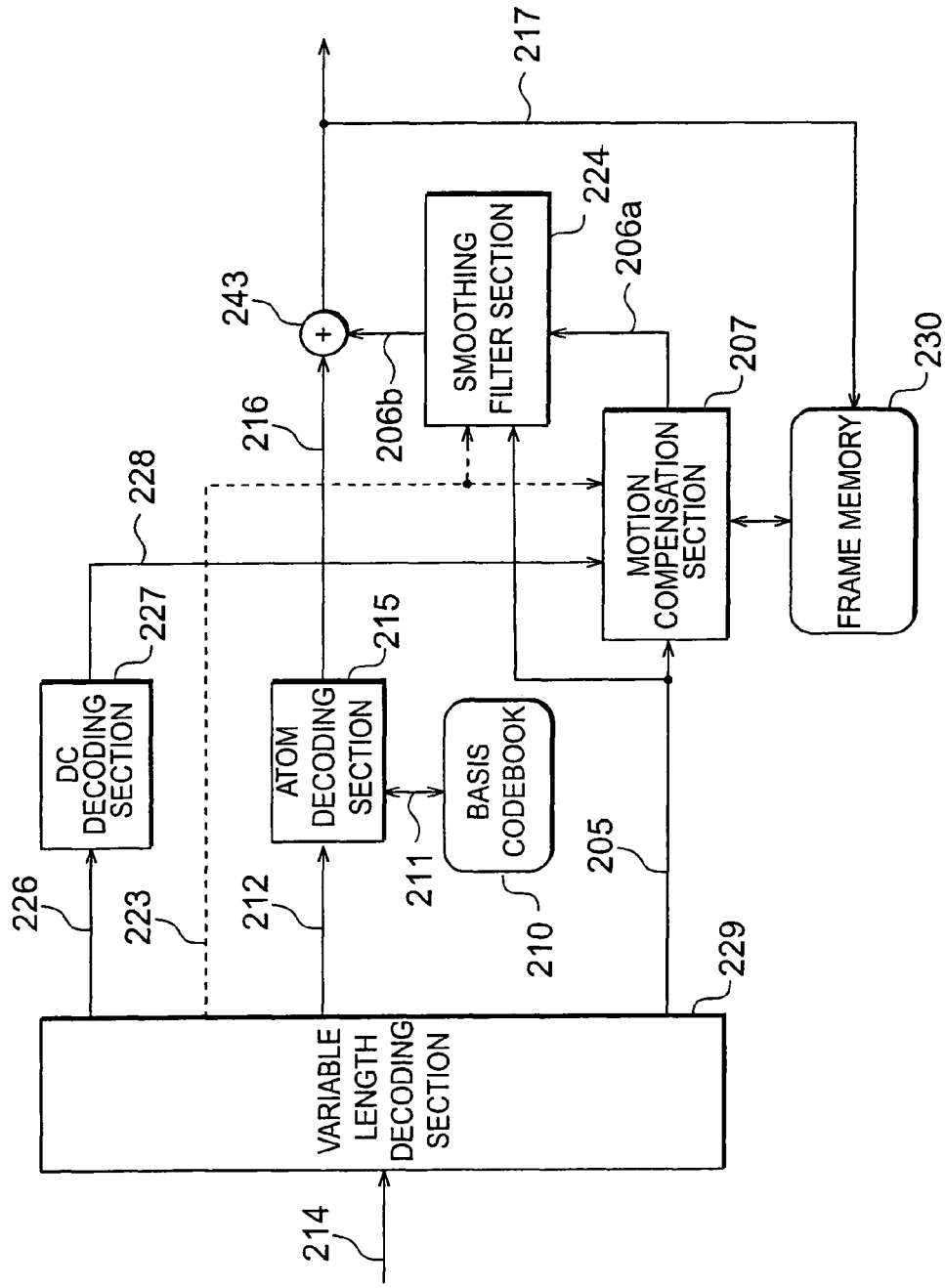
FIG. 13 is a block diagram showing the constitution of the image decoding apparatus according to the second embodiment.

FIG. 12 is a block diagram showing the constitution of the image coding apparatus according to the second embodiment of the present invention, and FIG. 13 is a block diagram showing the constitution of the image decoding apparatus thereof. The second embodiment relates to an apparatus constituted by introducing the smoothing filter of the present invention described above to an image coding and decoding apparatus according to a compression coding system that applies the technique known as Matching Pursuits. Image coding systems that use Matching Pursuits include that disclosed by R. Neff et al, "Very Low Bit-rate Video Coding Based on Matching Pursuits", IEEE Trans. on CSVT, vol. 7, pp. 158-171, February 1997. With Matching Pursuits, a prediction residual image signal f to be encoded can be rendered as per the following formula by using an over-complete basis set G prepared in advance that comprises n types of basis $g_k \in G$ ($1 \leq k \leq n$).

$$f = \left(\sum_{i=0}^{m-1} \langle s_i, g_{ki}\rangle g_{ki}\right) + r_m \quad (1)$$

Here, m is the total number of basis search steps, i is the basis search step number, and $r_i$ is the prediction residual image signal following completion of the basis search of the (i−1)th step, this signal being without further processing the prediction residual image signal for the basis search of the ith step, where $r_0$=f. Further, $s_i$ and $g_{ki}$ are the partial region and basis respectively, these being obtained by selecting, in the basis search of the ith step, a combination of s and $g_k$ such that the inner product value thereof is maximized, from optional partial regions s (partial regions in a frame) of $r_i$, as well as optional bases $g_k$ contained in the basis set G. If the basis search is performed thus, the larger the number m of basis search steps, the less energy $r_m$ diminishes. This means that the greater the number of bases used in the rendition of the prediction residual image signal f, the better the signal can be rendered.

In each of the basis search steps, the data that is encoded is:
1) The index expressing $g_{ki}$ ($g_k$ is shared and maintained on the encoding side and the decoding side, which makes it possible to specify a basis by converting only the index data).
2) The inner product values $\langle s_i, g_{ki}\rangle$ (correspond to the basis coefficients), and
3) $s_i$ on-screen center position data $p_i=(x_i, y_i)$ A set of these parameters is collectively known as an atom. By means of this image signal rendition and encoding method, the number of encoded atoms is increased, that is, as the total number m of basis search steps increases, so too does the encoded volume, whereby distortion is reduced.

On the other hand, according to the image coding performed by Matching Pursuits in the above paper, MC is carried out independently from Matching Pursuits, and atom extraction is performed with respect to the prediction residual signal. In this case, there is the possibility that atoms will be extracted in positions extending over the MC block. So long as a system is adopted in which MC is dependent on the block structure, there is the disadvantage that a discontinuous waveform between MC blocks as described in the first embodiment above remains in the residual signal and thus a waveform which should not be encoded will be encoded.

Conventionally, overlapped MC that considers the motion vectors of neighboring MC blocks has been utilized as a measure to resolve the foregoing problem. However, overlapped MC references more numerous prediction values and performs calculations for the final prediction value by means of a weight sum and there is therefore the problem that the computational cost is high and it is not possible to perform adaptive smoothing with respect to the pixel values in the MC blocks, which obscures the prediction image excessively. By performing adaptive smoothing filter processing at the MC block boundaries as described in the first embodiment, smoothing of the residual signal can be performed without obscuring the prediction image excessively.

In the image coding apparatus shown in FIG. 12, the input image signal 201 is a temporal array of frame images which will subsequently embody the frame image unit signal. However, the frame image to be encoded corresponds to the current frame 601 shown in FIG. 21. The current frame is encoded by means of the following procedure.

First of all, the current frame is outputted to a motion detection section 202, and detection of the motion vectors 205 is performed by means of a procedure that is exactly the same as that of the motion detection section 102 of the first embodiment above. However, the motion detection section 202 divides the intra coding into that for the DC component and that for the AC component. The result of encoding the DC component is used as part of the prediction image and the AC component is encoded as part of the prediction residual. This constitutes processing to obtain the prediction image batchwise in frame units in order to use the Matching Pursuits.

Accordingly, when intra mode is selected in the motion detection section 202, the corresponding macroblock prediction image is filled by an intra DC component which is encoded and locally decoded. The intra DC component undergoes prediction from neighboring image data as well as quantization in a DC coding section 225, and is outputted to a variable length decoding section 213 as encoded data 226 and multiplexed in a compressed stream 214.

A motion compensation section 207 uses the DC component as above for intra mode macroblocks, and, for inter mode macroblocks, uses motion vectors 205 to reference a local decoding image 204 in the frame memory 203, whereby a prediction image 206a for the current frame is obtained. Although the motion detection section 202 and the motion compensation section 207 perform processing for each of the macroblocks, the differential signal with respect to the input image signal 201 (the prediction residual signal 208) is obtained by taking the frame as the unit. That is, the motion vectors 205 of individual macroblocks are maintained over the entire frame, whereby the prediction image 206a is constituted as a frame-unit image.

Next, the smoothing filter section 224 performs smoothing processing between the MC blocks of the prediction image 206a. The operation of a smoothing filter section 224 uses coding mode data 223 and motion vectors 205 and is implemented by means of processing like that in the first embodiment. The smoothed prediction image 206b is subtracted from the input image signal 201 by a subtraction section 241 to obtain a prediction residual signal 208.

Next, the atom extraction section 209 generates atom parameters 210 on the basis of the above-described Matching Pursuits algorithm, with respect to the prediction residual signal 208. A basis set $g_k$ 211 is stored in a basis codebook 210. If, based on the properties of the Matching Pursuits algorithm, a basis which can render the partial signal waveform as accurately as possible can be found in an initial search step, the partial signal waveform can be rendered by fewer atoms, that is, with a small encoded volume. Atoms are extracted over the whole area of the frame. For the coding of the position data in the atom parameters, making use of the fact that the atom coding order does not influence the decoding image, sorting is performed such that the atoms are aligned in order using two-dimensional co-ordinates with the top left-hand corner of the frame as the starting point, and the coding order is constructed so that the atoms are counted in macroblock units. The macroblock units are therefore constituted such that atom parameters 212 (the respective basis index, position data, and basis coefficient) are coded in proportion to the number of atoms contained in the macroblock units.

An atom decoding section 215 decodes a local decoding residual signal 216 from the atom parameters 212 and then obtains a local decoding image 217 by adding the local decoding residual signal 216 to the smoothed prediction image 206b by means of an addition section 242. The local decoding image 217 is stored in the frame memory 203 in order to be used in the MC for the next frame.

Next, the image decoding apparatus will be described by referring to FIG. 13. After the compressed stream 214 has been received by the image decoding apparatus, a variable length decoding section 229 detects a sync word that indicates the start of each frame, whereupon coding mode data 223, motion vectors 205 and atom parameters 212 are decoded in macroblock units. The motion vectors 205 are outputted to the motion compensation section 207 and the output 206a is inputted to the smoothing filter section 224, whereby the prediction image 206b is obtained. The atom parameters 212 are decoded by the atom decoding section 215. A basis is extracted by supplying a basis index to the basis codebook 210. The output 216 of the atom decoding section 215 is added to the prediction image 206b by means of an addition section 243 to produce the decoding image 217. The decoding image 217 is used in the MC for subsequent frames, and is therefore stored in a frame memory 230. The decoding image 217 is outputted to a display device (not shown) with predetermined display timing, whereby the image is played back.

Therefore, according to the image coding apparatus and the image decoding apparatus of the second embodiment, results similar to those for the first embodiment above can be obtained also for an image coding and decoding apparatus according to a compression coding system that applies the technique known as Matching Pursuits.

Third Embodiment

A third embodiment of the present invention will now be described. The third embodiment describes another smoothing filter section. This smoothing filter section is a modification of the smoothing filter sections 124 and 224 described in the above first and second embodiments respectively, and because this filter simply substitutes for the smoothing filter sections 124 and 224, this filter can be applied to the image coding apparatus and image decoding apparatus shown in FIGS. 1 and 2 or FIGS. 12 and 13 respectively. The internal constitution is also the same as that in FIG. 5.

With the smoothing filter section according to the third embodiment, the block activity level calculation section 125 does not define the block activity level information with respect to the blocks but instead defines this information with respect to the block boundaries. Consequently, the filter can be controlled by uniquely allocating an activity level without the selection of an activity level used in circumstances where the activity level differs between blocks as was described in the first and second embodiments.

Figure 14:
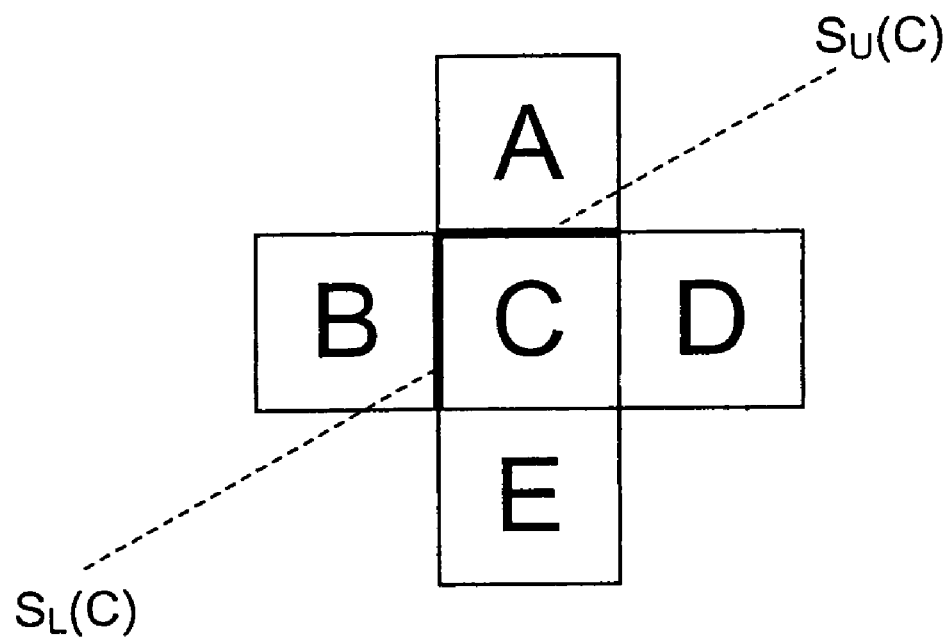
FIG. 14 serves to illustrate the definition, for block boundaries, of an activity level, in the smoothing filter section according to a third embodiment of the present invention.

The activity level is defined with respect to block boundaries and therefore, as shown in FIG. 14, activity levels $S_L(C)$ and $S_U(C)$ are defined for two boundaries to the left and above one block ('C' here) respectively. In the determination of $S_L(C)$, the activity level is found based on the relationship with block B to the left, and when $S_U(C)$ is determined, the activity level is found based on the relationship with block A above.

The boundaries between blocks D and E are determined as $S_L(D)$ and $S_U(E)$ respectively. As indicated in the first embodiment, the method of determining the activity level is determined by the motion vector difference between two blocks and by a difference in coding mode therebetween, and can therefore be determined using setting rules like those for the first embodiment.

Therefore, according to the smoothing filter section of the third embodiment, the filter can be controlled by uniquely allocating an activity level without the selection of an activity level used in circumstances where the activity level differs between blocks as was described in the first and second embodiments.

Furthermore, in the third embodiment, because the determination of the activity level is dependent on the blocks to the left and above alone, the apparatus, which generates the prediction image in macroblock units and encodes and decodes this image, is also able to carry out encoding and decoding processing while performing smoothing of the MC blocks. Further, by introducing pipeline processing in macroblock units, implementation that enables rapid and efficient processing is possible for the image coding apparatus and image decoding apparatus.

Fourth Embodiment

A fourth embodiment of the present invention will now be described. The fourth embodiment describes another smoothing filter section. This smoothing filter section is a modification of the smoothing filter sections 124 and 224 described in the above first and second embodiments respectively, and because this filter simply substitutes for the smoothing filter sections 124 and 224, this filter can be applied to the image coding apparatus and image decoding apparatus shown in FIGS. 1 and 2 or FIGS. 12 and 13 respectively. The internal constitution is also the same as that in FIG. 5.

Figure 15A:
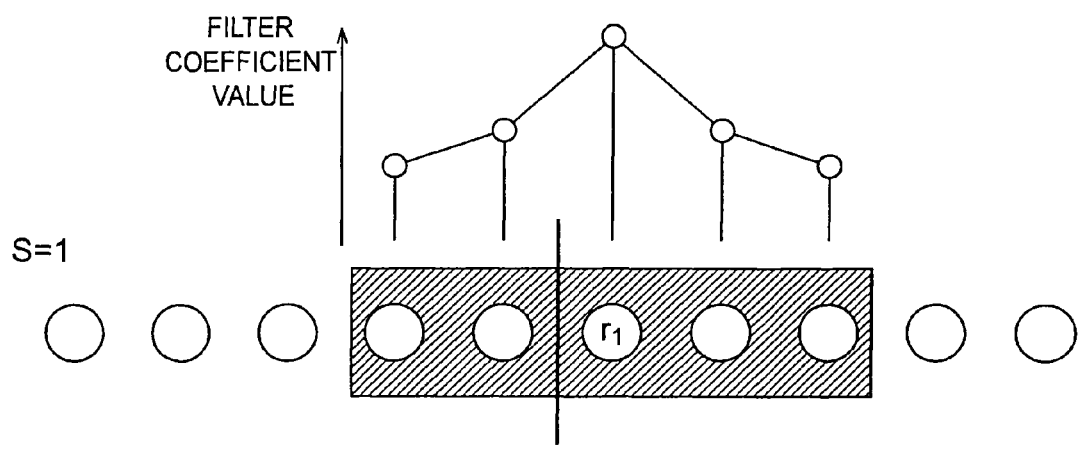
FIGS. 15A and 15B serve to illustrate a case where a 5-tap filter, which has the pixel to be filtered at the center and which uses two pixels to the left and right thereof respectively, is employed in the smoothing filter section according to a fourth embodiment of the present invention.
Figure 15B:
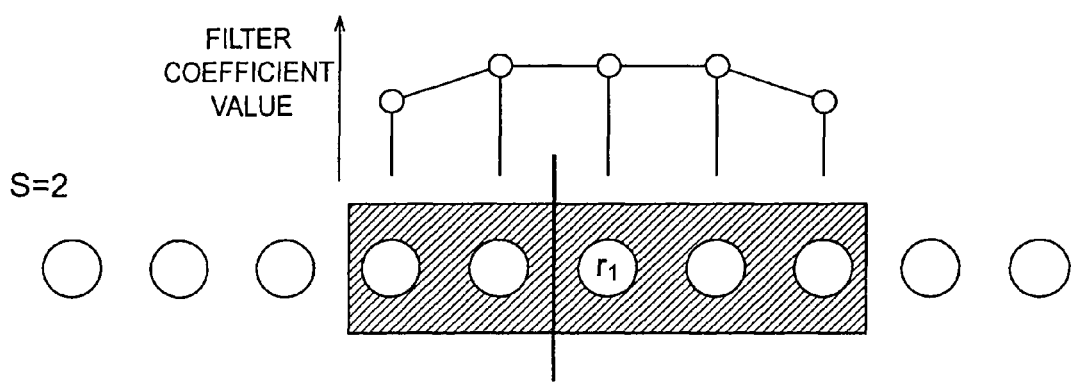

The smoothing filter section of the fourth embodiment switches the filter characteristics in accordance with the activity level. FIGS. 15A and 15B illustrate a case where a 5-tape filter which has the pixel $r_1$ to be filtered at the center and which uses two pixels to the left and right thereof respectively, is applied. As shown in FIG. 15B, in a case where the activity level is high (S=2) and there is a desire to raise the extent of the smoothing still further, a filter that increases the influence of the nearby pixels in the filter window is applied, and conversely, in a case where the activity level is low (S=1) and there is a desire to suppress the excessive loss of detail caused by smoothing, a filter with which the pixel itself has considerable influence is applied, as shown in FIG. 15A.

Therefore, according to the smoothing filter section of the fourth embodiment, the extent of the smoothing according to the activity level can be controlled.

Further, the constitution may be such that, in the switching of the filter characteristics, a plurality of characteristics can be selected in accordance with the activity level, and such that information identifying the characteristics is multiplexed in a compressed stream 114 and transmitted to the image decoding apparatus. By mean of such a constitution, a more detailed adaptive judgment based on image analysis on the image coding apparatus side can be reflected in the filter characteristics, and the image decoding apparatus can thus implement adaptive smoothing filter processing without performing special image analysis processing as implemented by the image encoding apparatus. The fourth embodiment is equally applicable in cases of using an activity level which is defined for block boundaries as described in the third embodiment.

When the filter characteristics are switched, the type of filter characteristics used is transmitted as part of the header information at the start of the frame in the compressed stream, for example.

Fifth Embodiment

Figure 16:
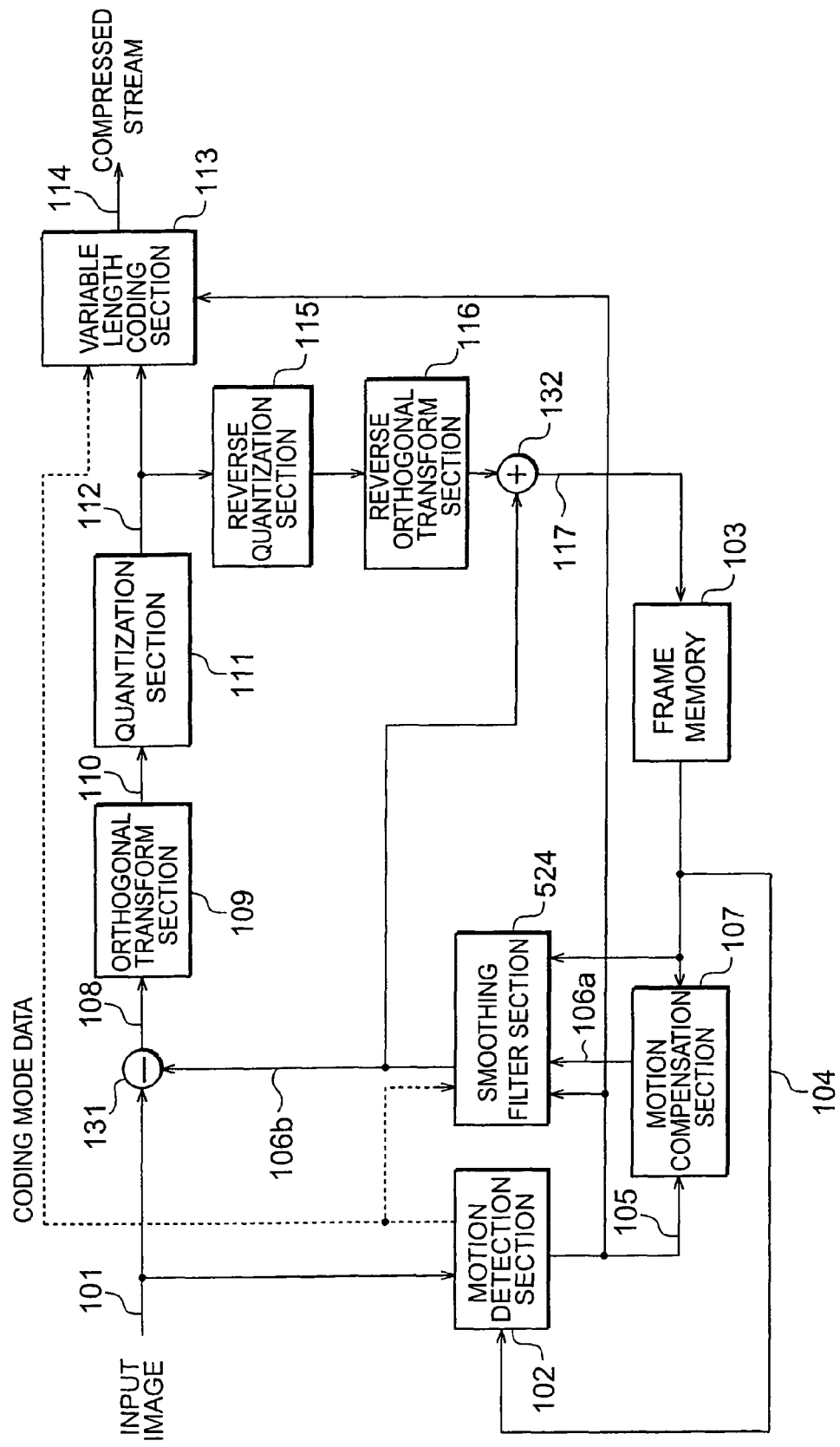
FIG. 16 is a block diagram showing the constitution of the image coding apparatus according to a fifth embodiment of the present invention.
Figure 17:
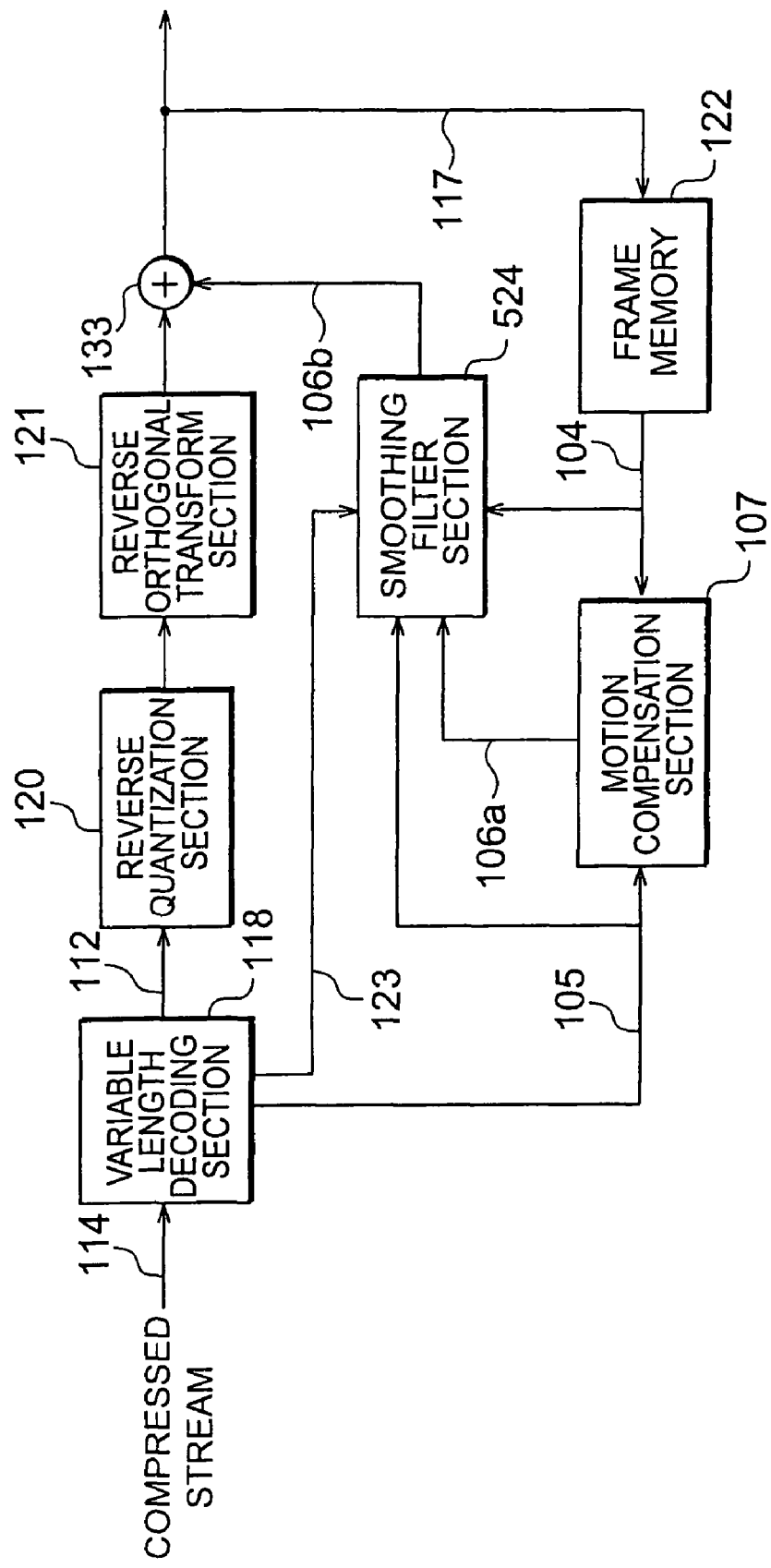
FIG. 17 is a block diagram showing the constitution of the image decoding apparatus according to the fifth embodiment.

FIG. 16 is a block diagram showing the constitution of the image coding apparatus according to the fifth embodiment of the present invention, and FIG. 17 is a block diagram showing the constitution of the image decoding apparatus thereof. However, those parts of the image coding apparatus of the fifth embodiment shown in FIG. 16 which correspond to parts of the first embodiment in FIG. 1 have been assigned the same reference symbols, and those parts of the image decoding apparatus of the fifth embodiment shown in FIG. 17 which correspond to parts of the first embodiment in FIG. 2 have been assigned the same reference symbols, and hence a description of all these parts is omitted here.

The image coding apparatus shown in FIG. 16 and the image decoding apparatus shown in FIG. 17 differ from those of the first embodiment insofar as another smoothing filter section 524 is employed in place of the smoothing filter section 124. The internal constitution of the smoothing filter section 524 is shown in FIG. 18 and a flowchart illustrating the operation of a block activity level calculation section 525 in the smoothing filter section 524 is shown in FIG. 19.

That is, this smoothing filter section 524 is a modification of the smoothing filter sections 124 and 224 described in the above first and second embodiments respectively, and, with the exception of the inputting of the reference image 104, can simply substitute for these filters. In the fifth embodiment, the difference is obtained between the prediction image 106*a* prior to smoothing filter processing, and the reference image 104 which is in the frame memory 103 and from which the prediction image 106*a* originated, and filter control is performed on the basis of the corresponding error margin electric power.

The prediction image 106*a* is image data extracted from the reference image 104 using the motion vectors 105, and is image data that approximates the input image signal 101 inputted to the image coding apparatus. In other words, when points that are spatially the same in the reference image 104 and the prediction image 106*a* are compared, the error margin electric power is large in parts with movement, and in parts with very little movement, the error margin electric power is small. The magnitude of the motion vectors 105 does to some extent express the movement amount, but primary factors that are not dependent on a change to the image, such as noise, also influence detection, and therefore the extent and intensity of the movement cannot be adequately expressed by this magnitude alone. However, the above error margin electric power can be used as an indicator for the intensity of the movement, whereby the adaptability of the filter control can be improved. Further, the reference image 104 can use exactly the same data on the encoding and decoding sides and therefore, when introducing this control, implementation is possible without transmitting special identification information to the decoding apparatus.

Figure 18:
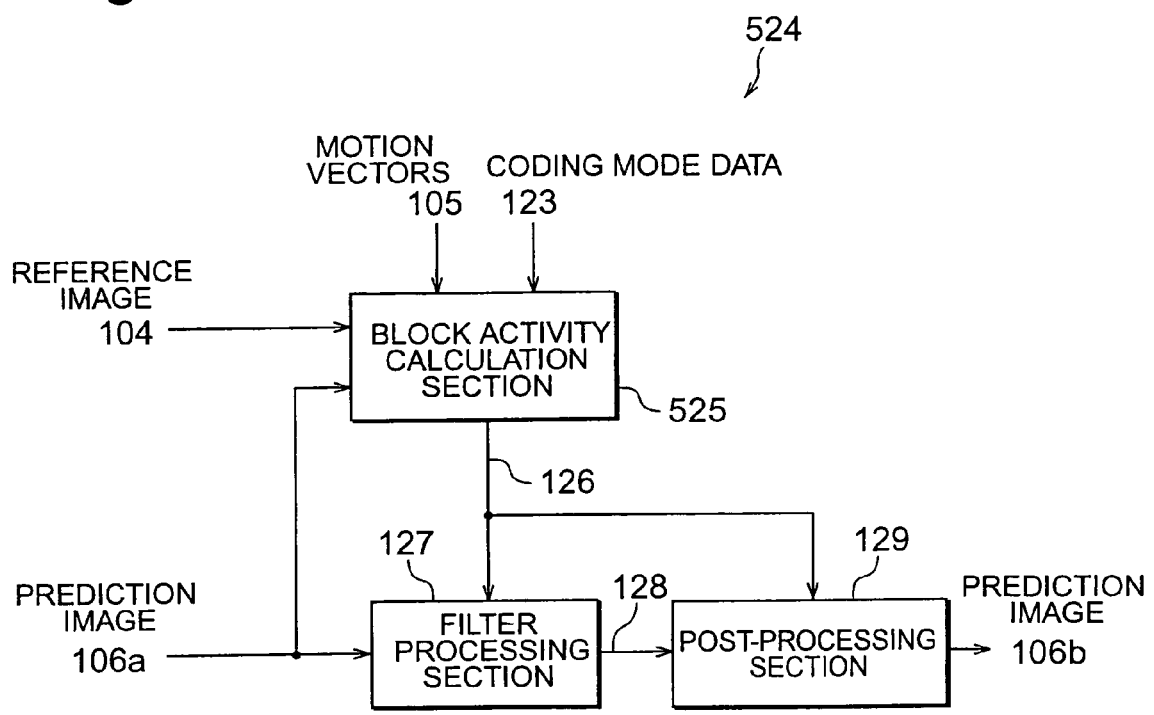
FIG. 18 is a block diagram showing the constitution of the smoothing filter section according to the fifth embodiment.
Figure 19:
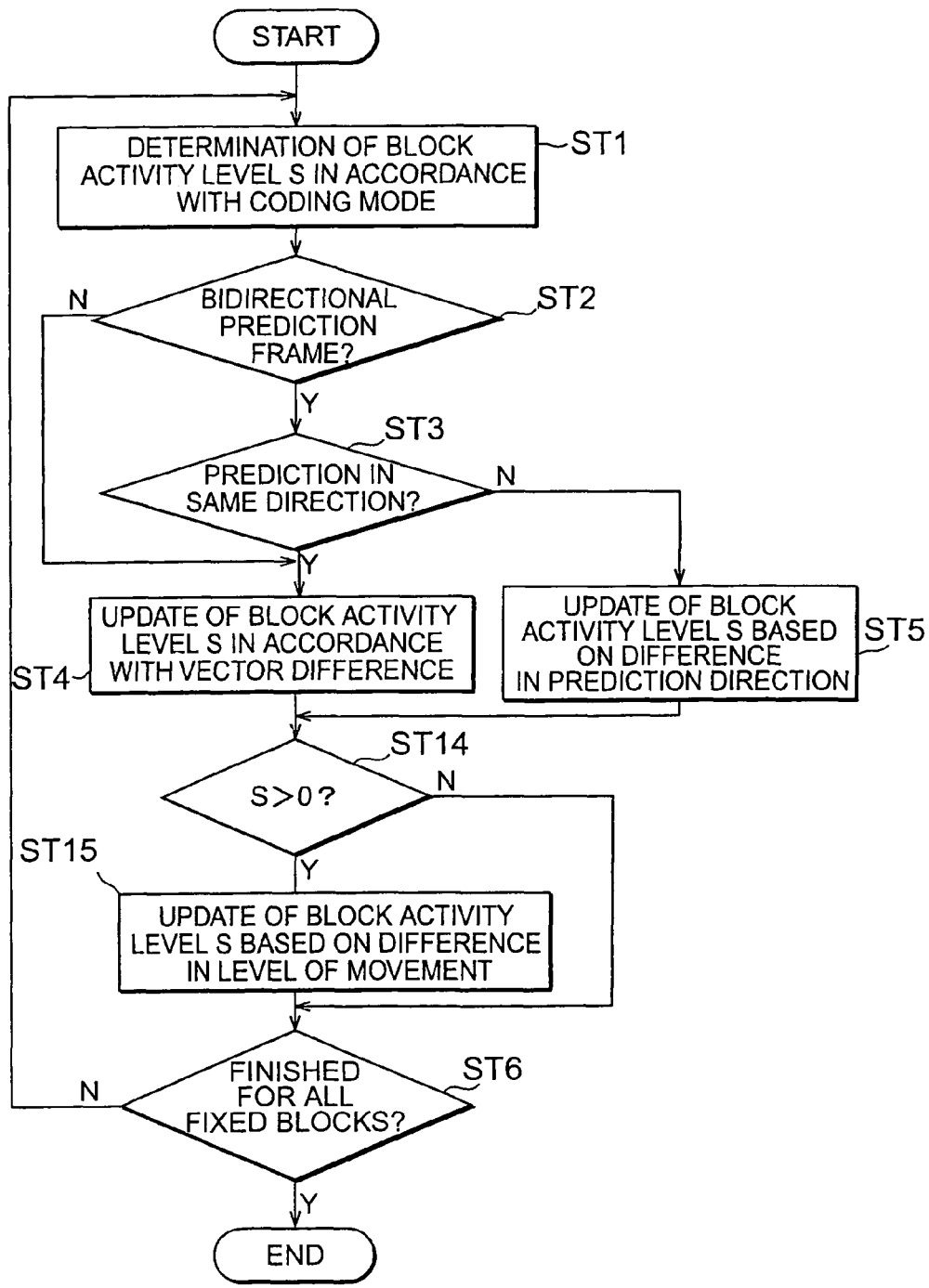
FIG. 19 is a flowchart to illustrate the operation of the block activity level calculation section in the smoothing filter section of the fifth embodiment.
Figure 20:
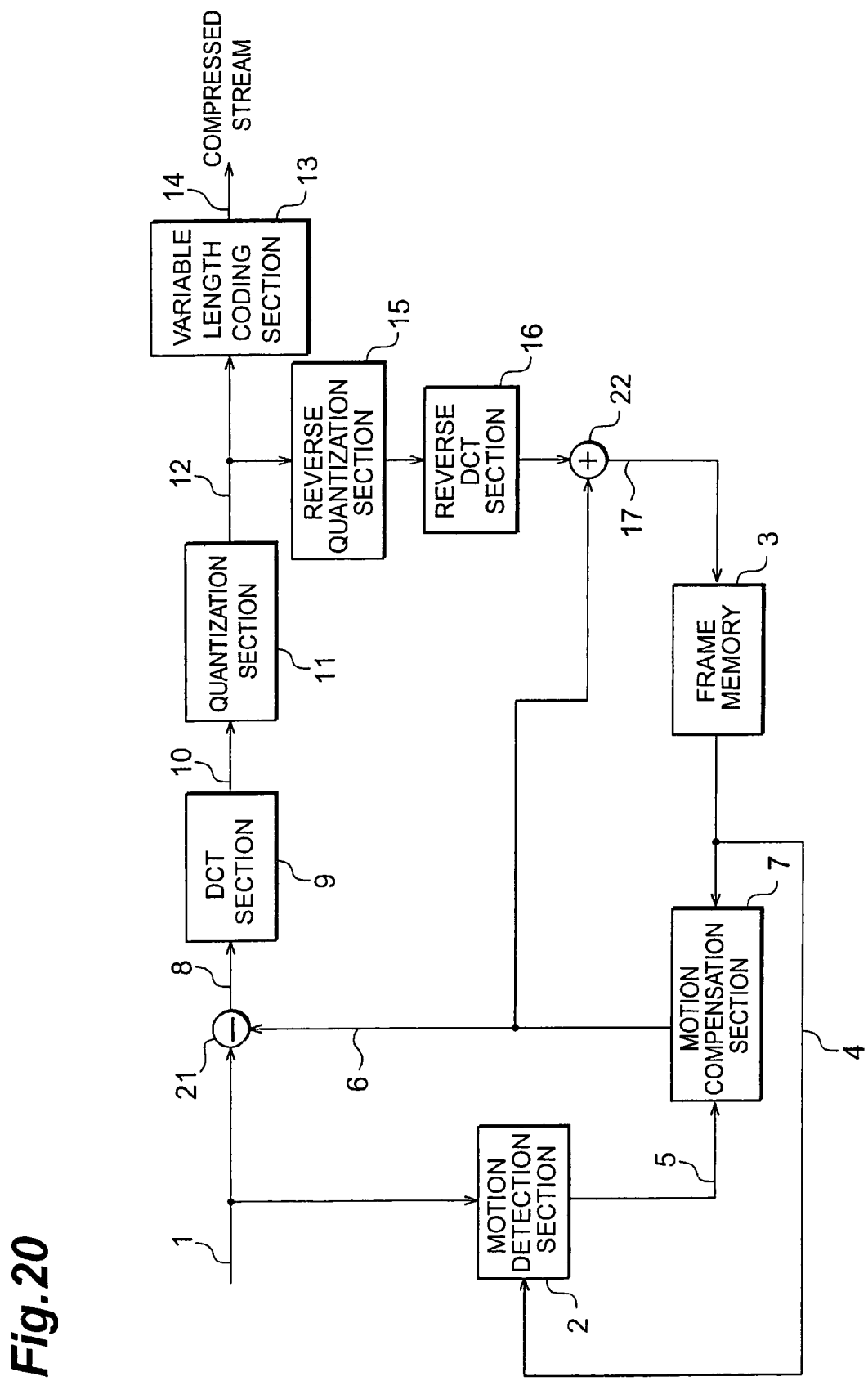
FIG. 20 is a block diagram showing the constitution of a conventional image coding apparatus based on an MPEG1 image coding system.

Specifically, as shown in FIG. 18, a reference image 104 and a prediction image 106*a* are inputted to the block activity level calculation section 525, and the error margin electric power between the reference image 104 and the prediction image 106*a* is found for each block. As shown in step ST14 in FIG. 19, in order to reduce the amount of extra computation here, the evaluation based on the error margin electric power is skipped at points where it is judged that the activity level is zero and there is no movement. This is because in cases where the motion vector difference mvd (X, Y) is zero, spatial continuity is maintained even though this may be a part with intense movement, meaning that it is not necessary to perform smoothing.

In cases where the activity level at least is more than zero, the activity level is not evaluated by means of motion vectors alone. Instead, the error margin electric power thus found is used, and when same is greater than a predetermined threshold value, the activity level is changed toward a larger value, and when the error margin electric power is smaller than a predetermined threshold value, the activity level is set to zero and smoothing is not performed (step ST15). At such time, the threshold value in the direction of raising the activity level and the threshold value in the direction of lowering the activity level need not necessarily be the same.

Further, in the fifth embodiment, as far as the reference image 104 is concerned, the constitution may be such that average values in blocks are precalculated and buffered in evaluation block units before this image is stored in the frame memory, and average values are similarly found for the prediction image 106*a*, whereby the error margin electric power evaluation is performed using only average values.

Because the average values of the error margin amounts between the reference image 104 and the prediction image 106*a* are controlling components and the average values alone can be stored in a small buffer, the frequency of access to the frame memory during an activity level calculation can be reduced without affecting the judgment of the activity level.

Furthermore, when the activity level is allocated at the block boundaries as is the case in the third embodiment above, the constitution can also be such that partial regions that extend across the block boundaries are defined and the error margin amount between the reference image 104 and the prediction image 106*a* is evaluated in these units.

In addition, in the fifth embodiment, an error margin amount between the reference image 104 and the prediction image 106*a* is used to update the activity level but may also be used to change the filter characteristics applied for points possessing a certain predetermined activity level value. For example, in cases where the activity level of a certain block or block boundary is an intermediate value in a defined activity level range, as the filter characteristics at this time are changed in accordance with the conditions, the adaptability increases still further. In order to achieve this object, a constitution is also possible in which an evaluation is adopted in which the error margin amount between the reference image 104 and the prediction image 106*a* is switched.

Therefore, by means of the smoothing filter section of the fifth embodiment, the adaptability of the filter control can be improved as described above, and the reference image 104 is able to use exactly the same data on the encoding and decoding sides, and therefore, when introducing this control, implementation is possible without transmitting special identification information to the decoding apparatus. Further, the frequency of access to the frame memory during an activity level calculation can be reduced without affecting the judgment of the activity level.

INDUSTRIAL APPLICABILITY

The present invention can be used as an image coding apparatus and an image decoding apparatus applied to a mobile image transmission system, for example.

The invention claimed is:

1. An image coding apparatus comprising:
   motion compensation predicting means for generating a motion-compensated prediction image by detecting movement amounts in predetermined first partial image regions of an input image with respect to a reference image;
   smoothing means for performing smoothing of pixels located at the boundaries of adjoining images of the first partial image regions, with respect to the motion-compensated prediction image obtained by the motion compensation predicting means; and
   prediction residual coding means for coding a prediction residual signal obtained from a difference between the input image and the smoothed prediction image,
   wherein the smoothing means further comprises,
      activity level setting means for determining an activity level of second partial image regions of the input image;
      adaptive smoothing means for establishing an intensity of the smoothing on a basis of the activity level set with said activity level setting means, and for performing smoothing of pixels located at the boundaries between adjoining images of the first partial image regions; and
      post-processing means for performing suppression processing of a result of smoothing by using a threshold value established in accordance with said activity level,
   wherein the first partial image regions are larger in size than the second partial image regions, so that at least one second partial image region fits into one of the first partial image regions, and at least one of the second partial image regions overlap a boundary of two adjacent first partial image regions when determining said activity level by the activity level setting means, and the second partial image regions are arranged in a cross-like pattern, having a central block with two blocks arranged above and below the central block, and two other blocks arranged to the left and the right of the central block.

2. The image coding apparatus as defined in claim 1 wherein the motion compensation predicting means detects the movement amount by using encoded local decoding image data as the reference image.

3. The image coding apparatus as defined in claim 1 wherein the smoothing means performs the smoothing in accordance with a difference value for the movement amount between the adjoining images of the first partial image regions.

4. The image coding apparatus as defined in claim 1 wherein the smoothing means performs the smoothing in accordance with a difference in a coding method between the adjoining images of the first partial image regions.

5. The image coding apparatus as defined in claim 1 wherein the smoothing means performs the smoothing based on whether the adjoining images of the first partial image regions have been predicted by bidirectional prediction, by unidirectional prediction, or by I-frame prediction.

6. The image coding apparatus as defined in claim 1 wherein the smoothing means performs the smoothing in accordance with an error margin amount between the prediction image prior to smoothing, and the reference image from which the prediction image obtained by the motion compensation predicting means is generated.

7. The image coding apparatus as defined in claim 1, wherein said activity level of the second partial image regions is determined on a basis of at least one of: a difference value for the movement amount between the adjoining images of the first partial image regions, a difference in coding method between the adjoining images of the first partial image regions, a difference in image prediction method between the adjoining images of the first partial image regions, and an error margin amount between the prediction image prior to smoothing, and the reference image from which the prediction image obtained by the motion compensation predicting means is generated.

8. The image coding apparatus as defined in claim 7 wherein the activity level setting means sets the activity level for individual second partial image regions and inputs to the adaptive smoothing means the larger value of values for the activity level obtained by comparing the first partial image regions which are subjected to smoothing.

9. The image coding apparatus as defined in claim 7 wherein the activity level setting means sets the activity level for boundaries between the first partial image regions and inputs the activity level to the adaptive smoothing means.

10. The image coding apparatus as defined in claim 7 wherein the adaptive smoothing means changes the number of pixels subjected to smoothing in accordance with the activity level obtained by the activity level setting means.

11. The image coding apparatus as defined in claim 7 wherein the adaptive smoothing means switches filter characteristics for performing the smoothing in accordance with the activity level obtained by the activity level setting means.

12. The image coding apparatus as defined in claim 11 wherein the adaptive smoothing means encodes and transmits a bit that indicates a type of filter characteristics for performing the smoothing.

13. The image coding apparatus as defined in claim 1 wherein a bit that indicates a presence or absence of smoothing by the smoothing means is encoded and transmitted.

14. An image decoding apparatus comprising:
- motion compensation predicting means for generating a motion-compensated prediction image by detecting movement amounts in predetermined first partial image regions with respect to a reference image;
- smoothing means for performing smoothing of pixels located at the boundaries of adjoining images of the first partial image regions, with respect to the motion-compensated prediction image obtained by the motion compensation predicting means;
- prediction residual decoding means for decoding a prediction residual signal from an encoding apparatus; and
- adding means for obtaining a decoded image by adding a decoded prediction residual signal obtained by the prediction residual decoding means, and a smoothed prediction image from the smoothing means,
- wherein the smoothing means further comprises,
    - activity level setting means for determining an activity level of second partial image regions;
    - adaptive smoothing means for establishing an intensity of the smoothing on a basis of the activity level set with said activity level setting means, and for performing smoothing of pixels located at the boundaries between adjoining images of the first partial image regions; and
    - post-processing means for performing suppression processing of a result of smoothing by using a threshold value established in accordance with said activity level,
- wherein the first partial image regions are larger in size than the second partial image regions, so that at least one second partial image region fits into one of the first partial image regions, and the second partial image regions overlap a boundary of two adjacent first partial image regions when determining said activity level by the activity level setting means, and the second partial image regions are arranged in a cross-like pattern, having a central block with two blocks arranged above and below the central block, and two other blocks arranged to the left and the right of the central block.

15. The image decoding apparatus as defined in claim 14 wherein the motion compensation predicting means obtains the prediction image by using decoded local decoding image data as the reference image.

16. The image decoding apparatus as defined in claim 14 wherein the smoothing means performs the smoothing in accordance with a difference value for the movement amount between the adjoining images of the first partial image regions.

17. The image decoding apparatus as defined in claim 14 wherein the smoothing means performs the smoothing in accordance with a difference in a decoding method between the adjoining images of the first partial image regions.

18. The image decoding apparatus as defined in claim 14 wherein the smoothing means performs the smoothing based on whether the adjoining images of the first partial image regions have been predicted by bidirectional prediction, by unidirectional prediction, or by I-frame prediction.

19. The image decoding apparatus as defined in claim 14 wherein the smoothing means performs the smoothing in accordance with an error margin amount between the prediction image prior to smoothing, and the reference image from which the prediction image obtained by the motion compensation predicting means is generated.

20. The image decoding apparatus as defined in claim 14, wherein said activity level of the second partial image regions is determined on a basis of at least one of: a difference value for the movement amount between the adjoining images of the first partial image regions, a difference in coding method between the adjoining images of the first partial image regions, a difference in image prediction method between the adjoining images of the first partial image regions, and an error margin amount between the prediction image prior to smoothing, and the reference image from which the prediction image obtained by the motion compensation predicting means is generated.

21. The image decoding apparatus as defined in claim 20 wherein the activity level setting means sets the activity level for individual second partial image regions and inputs to the adaptive smoothing means the larger value of values for the activity level obtained by comparing the first partial image regions which are subjected to smoothing.

22. The image decoding apparatus as defined in claim 20 wherein the activity level setting means sets the activity level for boundaries between the first partial image regions and inputs the activity level to the adaptive smoothing means.

23. The image decoding apparatus as defined in claim 20 wherein the adaptive smoothing means changes the number of pixels subjected to smoothing in accordance with the activity level obtained by the activity level setting means.

24. The image decoding apparatus as defined in claim 20 wherein the adaptive smoothing means switches filter characteristics for performing the smoothing in accordance with the activity level obtained by the activity level setting means.

25. The image decoding apparatus as defined in claim 24 wherein the adaptive smoothing means switches the filter characteristics on a basis of a bit that indicates a type of filter characteristics for performing the smoothing, the bit being decoded from compressed input data from the encoding apparatus.

26. The image decoding apparatus as defined in claim 14 wherein the smoothing processing is controlled on a basis of a bit that indicates a presence or absence of the smoothing, the bit being decoded from compressed input data.

27. An image coding method performed on a image coding apparatus, comprising:
- a motion compensation predicting step performed on a motion detection unit of the image coding apparatus of generating a motion-compensated prediction image by detecting movement amounts in predetermined first partial image regions of an input image with respect to a reference image stored in a frame memory;
- a smoothing step performed on a filter unit of the image coding apparatus of performing smoothing of pixels located at the boundaries of adjoining images of the first partial image regions, with respect to the motion-compensated prediction image obtained by the motion compensation predicting step; and
- a prediction residual coding step of coding a prediction residual signal obtained from the difference between the input image and the smoothed prediction image,
- wherein the smoothing step further comprises,
    - an activity level setting step of determining an activity level of second partial image regions;
    - an adaptive smoothing step of establishing an intensity of the smoothing on a basis of the activity level set with said activity level setting means, and of performing smoothing of pixels located at the boundaries between adjoining images of the first partial image regions; and a post-processing step of performing suppression processing of a result of the smoothing by using a threshold value established in accordance with the activity level, wherein the first partial image regions are larger in size than the second partial image regions, so that at least one second partial image region fits into one of the first partial image regions, and the second partial image regions overlap a boundary of two adjacent first partial image regions when determining said activity level by the activity level setting step, and the second partial image regions are arranged in a cross-like pattern, having a central block with two blocks arranged above and below the central block, and two other blocks arranged to the left and the right of the central block.

28. The image coding method performed on a image coding apparatus as defined in claim 27 wherein the motion compensation predicting step detects the movement amount by using encoded local decoding image data as the reference image.

29. The image coding method performed on a image coding apparatus as defined in claim 27 wherein the smoothing step performs the smoothing in accordance with a difference value for the movement amount between the adjoining images of the first partial image regions.

30. The image coding method performed on a image coding apparatus as defined in claim 27, wherein the smoothing step performs the smoothing based on whether the adjoining images of the first partial image regions have been predicted by bidirectional prediction, by unidirectional prediction, or by I-frame prediction.

31. The image coding method performed on a image coding apparatus as defined in claim 27 wherein the smoothing step performs the smoothing in accordance with a difference in a image prediction method between the adjoining images of the first partial image regions.

32. The image coding method performed on a image coding apparatus as defined in claim 27 wherein the smoothing step performs the smoothing in accordance with an error margin amount between the prediction image prior to smoothing, and the reference image from which the prediction image obtained by the motion compensation predicting step is generated.

33. The image coding method performed on a image coding apparatus as defined in claim 27, wherein said activity level of the second partial image regions is determined on a basis of at least one of: a difference value for the movement amount between the adjoining images of the first partial image regions, a difference in coding method between the adjoining images of the first partial image regions, a difference in image prediction method between the adjoining images of the first partial image regions, and an error margin amount between the prediction image prior to smoothing, and the reference image from which the prediction image obtained by the motion compensation predicting step is generated.

34. The image coding method performed on a image coding apparatus as defined in claim 33 wherein the activity level setting step sets the activity level for individual second partial image regions and inputs to the adaptive smoothing step the larger value of values for the activity level obtained by comparing the first partial image regions which are subjected to smoothing.

35. The image coding method performed on a image coding apparatus as defined in claim 33 wherein the activity level setting step sets the activity level for boundaries between the first partial image regions and inputs the activity level to the adaptive smoothing step.

36. The image coding method performed on a image coding apparatus as defined in claim 33 wherein the adaptive smoothing step changes the number of pixels subjected to smoothing in accordance with the activity level obtained by the activity level setting step.

37. The image coding method performed on a image coding apparatus as defined in claim 33 wherein the adaptive smoothing step switches filter characteristics for performing the smoothing in accordance with the activity level obtained by the activity level setting step.

38. The image coding method performed on a image coding apparatus as defined in claim 37 wherein the adaptive smoothing step encodes and transmits a bit that indicates a type of filter characteristics for performing the smoothing.

39. The image coding method performed on a image coding apparatus as defined in claim 27 wherein a bit that indicates a presence or absence of smoothing by the smoothing step is encoded and transmitted.

40. An image decoding method performed on a image coding apparatus comprising:

a motion compensation predicting step performed on a motion detection unit of the image coding apparatus of generating a motion-compensated prediction image by detecting movement amounts in predetermined first partial image regions with respect to a reference image stored in a frame memory;

a smoothing step performed on a filter unit of the image coding apparatus of performing smoothing of pixels located at the boundaries of adjoining images of the first partial image regions, with respect to the motion-compensated prediction image obtained by the motion compensation predicting step;

a prediction residual decoding step of decoding a prediction residual signal from an encoding apparatus; and an adding step of obtaining a decoded image by adding a decoded prediction residual signal obtained by the prediction residual decoding step, and the smoothed prediction image obtained by the smoothing step, wherein the smoothing step further comprises, an activity level setting step of determining an activity level of second partial image regions;

an adaptive smoothing step of establishing an intensity of the smoothing on a basis of the activity level set with said activity level setting step, and of performing smoothing of pixels located at the boundaries between adjoining images of the first partial image regions; and a post-processing step of performing suppression processing of a results of smoothing by using a threshold value established in accordance with said activity level, wherein the first partial image regions are larger in size than the second partial image regions, so that at least one second partial image region fits into one of the first partial image regions, and the second partial image regions overlap a boundary of two adjacent first partial image regions when determining said activity level by the activity level setting step, and the second partial image regions are arranged in a cross-like pattern, having a central block with two blocks arranged above and below the central block, and two other blocks arranged to the left and the right of the central block.

41. The image decoding method performed on a image coding apparatus as defined in claim 40 wherein the motion compensation predicting step obtains the prediction image by using decoded local decoding image data as the reference image.

42. The image decoding method performed on a image coding apparatus as defined in claim 40 wherein the smoothing step performs the smoothing in accordance with a difference value for the movement amount between the adjoining images of the first partial image regions.

43. The image decoding method performed on a image coding apparatus as defined in claim 40 wherein the smoothing step performs the smoothing based on whether the adjoining images of the first partial image regions have been predicted by bidirectional prediction, by unidirectional prediction, or by I-frame prediction.

44. The image decoding method performed on a image coding apparatus as defined in claim 40 wherein the smoothing step performs the smoothing in accordance with a difference in image prediction method between the adjoining images of the first partial image regions.

45. The image decoding method performed on a image coding apparatus as defined in claim 40 wherein the smoothing step performs the smoothing in accordance with an error margin amount between the prediction image prior to smoothing, and the reference image from which the prediction image obtained by the motion compensation predicting step is generated.

46. The image decoding method performed on a image coding apparatus as defined in claim 40, wherein said activity level of the second partial image regions is determined on a basis of at least one of: a difference value for the movement amount between the adjoining images of the first partial image regions, a difference in coding method between the adjoining images of the first partial image regions, a difference in image prediction method between the adjoining images of the first partial image regions, and an error margin amount between the prediction image prior to smoothing, and the reference image from which the prediction image obtained by the motion compensation predicting step is generated.

47. The image decoding method performed on a image coding apparatus as defined in claim 46 wherein the activity level setting step sets the activity level for individual second partial image regions and inputs to the adaptive smoothing step the larger value of values for the activity level obtained by comparing the first partial image regions which are subjected to smoothing.

48. The image decoding method performed on a image coding apparatus as defined in claim 46 wherein the activity level setting step sets the activity level for boundaries between the first partial image regions and inputs the activity level to the adaptive smoothing step.

49. The image decoding method performed on a image coding apparatus as defined in claim 46 wherein the adaptive smoothing step changes the number of pixels subjected to smoothing in accordance with the activity level obtained by the activity level setting step.

50. The image decoding method performed on a image coding apparatus as defined in claim 46 wherein the adaptive smoothing step switches filter characteristics for performing the smoothing in accordance with the activity level obtained by the activity level setting step.

51. The image decoding method performed on a image coding apparatus as defined in claim 50 wherein the adaptive smoothing step switches the filter characteristics on a basis of a bit that indicates a type of filter characteristics for performing the smoothing, the bit being decoded from compressed input data from the encoding apparatus.

52. The image decoding method performed on a image coding apparatus as defined in claim 40 wherein the smoothing processing is controlled on a basis of a bit that indicates a presence or absence of the smoothing, the bit being decoded from the compressed input data.

53. The image coding apparatus as defined in claim 1, wherein the activity level setting means determines a direction of a prediction for the blocks above, below, left, right of the central block, and determines a direction of prediction for the central block, and determines if the direction of prediction is the same for all the blocks.

54. The image decoding apparatus as defined in claim 14, wherein the activity level setting means determines a direction of a prediction for the blocks above, below, left, right of the central block, and determines a direction of prediction for the central block, and determines if the direction of prediction is the same for all the blocks.

55. The image coding method performed on a image coding apparatus as defined in claim 27, wherein the activity level setting step determines a direction of a prediction for the blocks above, below, left, right of the central block, and determines a direction of prediction for the central block, and determines if the direction of prediction is the same for all the blocks.

56. The image decoding method performed on a image coding apparatus as defined in claim 40, wherein the activity level setting step determines a direction of a prediction for the blocks above, below, left, right of the central block, and determines a direction of prediction for the central block, and determines if the direction of prediction is the same for all the blocks.

* * * * *